(12) United States Patent
Tarelli et al.

(10) Patent No.: US 11,977,683 B2
(45) Date of Patent: May 7, 2024

(54) MODULAR SYSTEMS CONFIGURED TO PROVIDE LOCALIZED HAPTIC FEEDBACK USING INERTIAL ACTUATORS

(71) Applicant: Apple Inc., Cupertino, CA (US)

(72) Inventors: Riccardo Tarelli, Palo Alto, CA (US); Muhammad F. Hossain, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 466 days.

(21) Appl. No.: 17/200,640

(22) Filed: Mar. 12, 2021

(65) Prior Publication Data
US 2022/0291746 A1    Sep. 15, 2022

(51) Int. Cl.
| | | |
|---|---|---|
| G06F 3/01 | (2006.01) | |
| F16F 15/12 | (2006.01) | |
| F16F 15/124 | (2006.01) | |
| G08B 6/00 | (2006.01) | |

(52) U.S. Cl.
CPC .......... *G06F 3/016* (2013.01); *F16F 15/1203* (2013.01); *F16F 15/124* (2013.01); *G08B 6/00* (2013.01)

(58) Field of Classification Search
None
See application file for complete search history.

(56) References Cited

U.S. PATENT DOCUMENTS

| | | |
|---|---|---|
| 3,001,049 A | 9/1961 | Didier |
| 3,390,287 A | 6/1968 | Sonderegger |
| 3,419,739 A | 12/1968 | Clements |
| 4,236,132 A | 11/1980 | Zissimopoulos |
| 4,412,148 A | 10/1983 | Klicker et al. |
| 4,414,984 A | 11/1983 | Zarudiansky |
| 4,490,815 A | 12/1984 | Umehara et al. |
| 4,695,813 A | 9/1987 | Nobutoki et al. |
| 4,975,616 A | 12/1990 | Park |
| 5,010,772 A | 4/1991 | Bourland |

(Continued)

FOREIGN PATENT DOCUMENTS

| | | |
|---|---|---|
| AU | 2015100710 | 7/2015 |
| AU | 2016100399 | 5/2016 |

(Continued)

OTHER PUBLICATIONS

U.S. Appl. No. 16/581,686, filed Sep. 24, 2019, Amin-Shahidi et al.

(Continued)

*Primary Examiner* — Toan H Vu
(74) *Attorney, Agent, or Firm* — Brownstein Hyatt Farber Schreck, LLP

(57) ABSTRACT

An electronic device includes a housing defining an aperture. An input device extends through the aperture and has a user input surface external to the housing. An inertial actuator is mechanically and fixedly coupled to the input device and positioned within the housing. A mechanical wave dampener provides mechanical wave dampening between the input device and the housing. The electronic device enables haptic feedback to be provided locally to the input device. In some cases, the mechanical wave dampener may dampen shaking of the input device with respect to the housing by at least an order of magnitude.

19 Claims, 11 Drawing Sheets

(56) References Cited

U.S. PATENT DOCUMENTS

| | | |
|---|---|---|
| 5,245,734 A | 9/1993 | Issartel |
| 5,283,408 A | 2/1994 | Chen |
| 5,293,161 A | 3/1994 | MacDonald et al. |
| 5,317,221 A | 5/1994 | Kubo et al. |
| 5,365,140 A | 11/1994 | Ohya et al. |
| 5,434,549 A | 7/1995 | Hirabayashi et al. |
| 5,436,622 A | 7/1995 | Gutman et al. |
| 5,510,584 A | 4/1996 | Norris |
| 5,510,783 A | 4/1996 | Findlater et al. |
| 5,513,100 A | 4/1996 | Parker et al. |
| 5,587,875 A | 12/1996 | Sellers |
| 5,590,020 A | 12/1996 | Sellers |
| 5,602,715 A | 2/1997 | Lempicki et al. |
| 5,619,005 A | 4/1997 | Shibukawa et al. |
| 5,621,610 A | 4/1997 | Moore et al. |
| 5,625,532 A | 4/1997 | Sellers |
| 5,629,578 A | 5/1997 | Winzer et al. |
| 5,635,928 A | 6/1997 | Takagi et al. |
| 5,718,418 A | 2/1998 | Gugsch |
| 5,739,759 A | 4/1998 | Nakazawa et al. |
| 5,742,242 A | 4/1998 | Sellers |
| 5,783,765 A | 7/1998 | Muramatsu |
| 5,793,605 A | 8/1998 | Sellers |
| 5,812,116 A | 9/1998 | Malhi |
| 5,813,142 A | 9/1998 | Demon |
| 5,818,149 A | 10/1998 | Safari et al. |
| 5,896,076 A | 4/1999 | Van Namen |
| 5,907,199 A | 5/1999 | Miller |
| 5,951,908 A | 9/1999 | Cui et al. |
| 5,959,613 A | 9/1999 | Rosenberg et al. |
| 5,973,441 A | 10/1999 | Lo et al. |
| 5,982,304 A | 11/1999 | Selker et al. |
| 5,982,612 A | 11/1999 | Roylance |
| 5,995,026 A | 11/1999 | Sellers |
| 5,999,084 A | 12/1999 | Armstrong |
| 6,035,257 A | 3/2000 | Epperson |
| 6,069,433 A | 5/2000 | Lazarus et al. |
| 6,078,308 A | 6/2000 | Rosenberg et al. |
| 6,104,947 A | 8/2000 | Heikkila et al. |
| 6,127,756 A | 10/2000 | Iwaki |
| 6,135,886 A | 10/2000 | Armstrong |
| 6,198,206 B1 | 3/2001 | Saarmaa |
| 6,218,966 B1 | 4/2001 | Goodwin |
| 6,219,033 B1 | 4/2001 | Rosenberg |
| 6,220,550 B1 | 4/2001 | McKillip, Jr. |
| 6,222,525 B1 | 4/2001 | Armstrong |
| 6,252,336 B1 | 6/2001 | Hall |
| 6,342,880 B2 | 1/2002 | Rosenberg et al. |
| 6,351,205 B1 | 2/2002 | Armstrong |
| 6,373,465 B2 | 4/2002 | Jolly et al. |
| 6,408,187 B1 | 6/2002 | Merriam |
| 6,411,276 B1 | 6/2002 | Braun et al. |
| 6,429,849 B1 | 8/2002 | An |
| 6,437,485 B1 | 8/2002 | Johansson |
| 6,438,393 B1 | 8/2002 | Surronen |
| 6,444,928 B2 | 9/2002 | Okamoto et al. |
| 6,455,973 B1 | 9/2002 | Ineson |
| 6,465,921 B1 | 10/2002 | Horng |
| 6,552,404 B1 | 4/2003 | Hynes |
| 6,552,471 B1 | 4/2003 | Chandran et al. |
| 6,557,072 B2 | 4/2003 | Osborn |
| 6,642,857 B1 | 11/2003 | Schediwy |
| 6,693,626 B1 | 2/2004 | Rosenberg |
| 6,717,573 B1 | 4/2004 | Shahoian et al. |
| 6,747,400 B2 | 6/2004 | Maichl et al. |
| 6,809,462 B2 | 10/2004 | Pelrine et al. |
| 6,809,727 B2 | 10/2004 | Piot et al. |
| 6,864,877 B2 | 3/2005 | Braun et al. |
| 6,906,697 B2 | 6/2005 | Rosenberg |
| 6,906,700 B1 | 6/2005 | Armstrong |
| 6,906,703 B2 | 6/2005 | Vablais et al. |
| 6,952,203 B2 | 10/2005 | Banerjee et al. |
| 6,954,657 B2 | 10/2005 | Bork et al. |
| 6,963,762 B2 | 11/2005 | Kaaresoja et al. |
| 6,965,189 B2 | 11/2005 | Menzel |
| 6,995,752 B2 | 2/2006 | Lu |
| 7,005,811 B2 | 2/2006 | Wakuda et al. |
| 7,016,707 B2 | 3/2006 | Fujisawa et al. |
| 7,022,927 B2 | 4/2006 | Hsu |
| 7,023,112 B2 | 4/2006 | Miyamoto et al. |
| 7,081,701 B2 | 7/2006 | Yoon et al. |
| 7,091,948 B2 | 8/2006 | Chang et al. |
| 7,121,147 B2 | 10/2006 | Okada |
| 7,123,948 B2 | 10/2006 | Nielsen |
| 7,130,664 B1 | 10/2006 | Williams |
| 7,136,045 B2 | 11/2006 | Rosenberg et al. |
| 7,158,122 B2 | 1/2007 | Roberts |
| 7,161,580 B2 | 1/2007 | Bailey et al. |
| 7,162,928 B2 | 1/2007 | Shank et al. |
| 7,170,498 B2 | 1/2007 | Huang |
| 7,176,906 B2 | 2/2007 | Williams et al. |
| 7,180,500 B2 | 2/2007 | Marvit et al. |
| 7,182,691 B1 | 2/2007 | Schena |
| 7,194,645 B2 | 3/2007 | Bieswanger et al. |
| 7,205,978 B2 | 4/2007 | Poupyrev |
| 7,217,891 B2 | 5/2007 | Fischer et al. |
| 7,218,310 B2 | 5/2007 | Tierling et al. |
| 7,219,561 B2 | 5/2007 | Okada |
| 7,253,350 B2 | 8/2007 | Noro et al. |
| 7,269,484 B2 | 9/2007 | Hein |
| 7,333,604 B2 | 2/2008 | Zernovizky et al. |
| 7,334,350 B2 | 2/2008 | Ellis |
| 7,348,968 B2 | 3/2008 | Dawson |
| 7,382,357 B2 | 6/2008 | Panotopoulos et al. |
| 7,388,741 B2 | 6/2008 | Konuma et al. |
| 7,392,066 B2 | 6/2008 | Hapamas |
| 7,423,631 B2 | 9/2008 | Shahoian et al. |
| 7,446,752 B2 | 11/2008 | Goldenberg et al. |
| 7,469,155 B2 | 12/2008 | Chu |
| 7,469,595 B2 | 12/2008 | Kessler et al. |
| 7,471,033 B2 | 12/2008 | Thiesen et al. |
| 7,495,358 B2 | 2/2009 | Kobayashi et al. |
| 7,508,382 B2 | 3/2009 | Denoue et al. |
| 7,561,142 B2 | 7/2009 | Shahoian et al. |
| 7,562,468 B2 | 7/2009 | Ellis |
| 7,569,086 B2 | 8/2009 | Chandran |
| 7,575,368 B2 | 8/2009 | Guillaume |
| 7,586,220 B2 | 9/2009 | Roberts |
| 7,619,498 B2 | 11/2009 | Miura |
| 7,639,232 B2 | 12/2009 | Grant et al. |
| 7,641,618 B2 | 1/2010 | Noda et al. |
| 7,647,196 B2 | 1/2010 | Kahn et al. |
| 7,649,305 B2 | 1/2010 | Priya et al. |
| 7,675,253 B2 | 3/2010 | Dorel |
| 7,675,414 B2 | 3/2010 | Ray |
| 7,679,611 B2 | 3/2010 | Schena |
| 7,707,742 B2 | 5/2010 | Ellis |
| 7,710,399 B2 | 5/2010 | Bruneau et al. |
| 7,732,951 B2 | 6/2010 | Mukaide |
| 7,737,828 B2 | 6/2010 | Yang et al. |
| 7,742,036 B2 | 6/2010 | Grant et al. |
| 7,788,032 B2 | 8/2010 | Moloney |
| 7,793,429 B2 | 9/2010 | Ellis |
| 7,793,430 B2 | 9/2010 | Ellis |
| 7,798,982 B2 | 9/2010 | Zets et al. |
| 7,868,489 B2 | 1/2011 | Amemiya et al. |
| 7,886,621 B2 | 2/2011 | Smith et al. |
| 7,888,892 B2 | 2/2011 | McReynolds et al. |
| 7,893,922 B2 | 2/2011 | Klinghult et al. |
| 7,919,945 B2 | 4/2011 | Houston et al. |
| 7,929,382 B2 | 4/2011 | Yamazaki |
| 7,946,483 B2 | 5/2011 | Miller et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,961,909 B2 | 6/2011 | Mandella et al. |
| 8,018,105 B2 | 9/2011 | Erixon et al. |
| 8,031,172 B2 | 10/2011 | Kruse et al. |
| 8,044,940 B2 | 10/2011 | Narusawa |
| 8,069,881 B1 | 12/2011 | Cunha |
| 8,072,418 B2 | 12/2011 | Crawford et al. |
| 8,077,145 B2 | 12/2011 | Rosenberg et al. |
| 8,081,156 B2 | 12/2011 | Ruettiger |
| 8,082,640 B2 | 12/2011 | Takeda |

(56) References Cited

U.S. PATENT DOCUMENTS

| | | |
|---|---|---|
| 8,084,968 B2 | 12/2011 | Murray et al. |
| 8,098,234 B2 | 1/2012 | Lacroix et al. |
| 8,123,660 B2 | 2/2012 | Kruse et al. |
| 8,125,453 B2 | 2/2012 | Shahoian et al. |
| 8,141,276 B2 | 3/2012 | Ellis |
| 8,156,809 B2 | 4/2012 | Tierling et al. |
| 8,169,401 B2 | 5/2012 | Hardwick |
| 8,174,344 B2 | 5/2012 | Yakima et al. |
| 8,174,372 B2 | 5/2012 | da Costa |
| 8,179,027 B2 | 5/2012 | Barta et al. |
| 8,179,202 B2 | 5/2012 | Cruz-Hernandez et al. |
| 8,188,623 B2 | 5/2012 | Park |
| 8,205,356 B2 | 6/2012 | Ellis |
| 8,210,942 B2 | 7/2012 | Shimabukuro et al. |
| 8,232,494 B2 | 7/2012 | Purcocks |
| 8,242,641 B2 | 8/2012 | Bae |
| 8,248,277 B2 | 8/2012 | Peterson et al. |
| 8,248,278 B2 | 8/2012 | Schlosser et al. |
| 8,253,686 B2 | 8/2012 | Kyung et al. |
| 8,255,004 B2 | 8/2012 | Huang et al. |
| 8,261,468 B2 | 9/2012 | Ellis |
| 8,264,465 B2 | 9/2012 | Grant et al. |
| 8,270,114 B2 | 9/2012 | Argumedo et al. |
| 8,270,148 B2 | 9/2012 | Griffith et al. |
| 8,288,899 B2 | 10/2012 | Park et al. |
| 8,291,614 B2 | 10/2012 | Ellis |
| 8,294,600 B2 | 10/2012 | Peterson et al. |
| 8,315,746 B2 | 11/2012 | Cox et al. |
| 8,339,250 B2 | 12/2012 | Je et al. |
| 8,344,834 B2 | 1/2013 | Niiyama |
| 8,345,013 B2 | 1/2013 | Heubel et al. |
| 8,373,549 B2 | 2/2013 | Fadell et al. |
| 8,378,797 B2 | 2/2013 | Pance et al. |
| 8,378,798 B2 | 2/2013 | Bells et al. |
| 8,378,965 B2 | 2/2013 | Gregorio et al. |
| 8,384,316 B2 | 2/2013 | Houston et al. |
| 8,384,679 B2 | 2/2013 | Paleczny et al. |
| 8,388,346 B2 | 3/2013 | Rantala et al. |
| 8,390,594 B2 | 3/2013 | Modarres et al. |
| 8,395,587 B2 | 3/2013 | Cauwels et al. |
| 8,398,570 B2 | 3/2013 | Mortimer et al. |
| 8,405,618 B2 | 3/2013 | Colgate et al. |
| 8,411,058 B2 | 4/2013 | Wong et al. |
| 8,446,264 B2 | 5/2013 | Tanase |
| 8,451,255 B2 | 5/2013 | Weber et al. |
| 8,452,345 B2 | 5/2013 | Lee et al. |
| 8,461,951 B2 | 6/2013 | Gassmann et al. |
| 8,466,889 B2 | 6/2013 | Tong et al. |
| 8,471,690 B2 | 6/2013 | Hennig et al. |
| 8,487,759 B2 | 7/2013 | Hill |
| 8,515,398 B2 | 8/2013 | Song et al. |
| 8,542,134 B2 | 9/2013 | Peterson et al. |
| 8,545,322 B2 | 10/2013 | George et al. |
| 8,547,341 B2 | 10/2013 | Takashima et al. |
| 8,547,350 B2 | 10/2013 | Anglin et al. |
| 8,552,859 B2 | 10/2013 | Pakula et al. |
| 8,570,291 B2 | 10/2013 | Motomura |
| 8,575,794 B2 | 11/2013 | Lee et al. |
| 8,587,955 B2 | 11/2013 | DiFonzo et al. |
| 8,593,409 B1 | 11/2013 | Heubel |
| 8,598,893 B2 | 12/2013 | Camus |
| 8,599,047 B2 | 12/2013 | Schlosser et al. |
| 8,599,152 B1 | 12/2013 | Wurtenberger et al. |
| 8,600,354 B2 | 12/2013 | Esaki |
| 8,614,431 B2 | 12/2013 | Huppi et al. |
| 8,621,348 B2 | 12/2013 | Ramsay et al. |
| 8,629,843 B2 | 1/2014 | Steeves et al. |
| 8,633,916 B2 | 1/2014 | Bernstein et al. |
| 8,674,941 B2 | 3/2014 | Casparian et al. |
| 8,680,723 B2 | 3/2014 | Subramanian |
| 8,681,092 B2 | 3/2014 | Harada et al. |
| 8,682,396 B2 | 3/2014 | Yang et al. |
| 8,686,952 B2 | 4/2014 | Burrough et al. |
| 8,710,966 B2 | 4/2014 | Hill |
| 8,717,309 B2 | 5/2014 | Almalki |
| 8,723,813 B2 | 5/2014 | Park et al. |
| 8,733,540 B2 | 5/2014 | Woiler et al. |
| 8,735,755 B2 | 5/2014 | Peterson et al. |
| 8,760,273 B2 | 6/2014 | Casparian et al. |
| 8,760,413 B2 | 6/2014 | Peterson et al. |
| 8,780,060 B2 | 7/2014 | Maschmeyer et al. |
| 8,787,006 B2 | 7/2014 | Golko et al. |
| 8,797,152 B2 | 8/2014 | Henderson et al. |
| 8,798,534 B2 | 8/2014 | Rodriguez et al. |
| 8,803,842 B2 | 8/2014 | Wakasugi et al. |
| 8,816,981 B2 | 8/2014 | Kai et al. |
| 8,836,502 B2 | 9/2014 | Culbert et al. |
| 8,857,248 B2 | 10/2014 | Shih et al. |
| 8,860,562 B2 | 10/2014 | Hill |
| 8,861,776 B2 | 10/2014 | Lastrucci |
| 8,866,600 B2 | 10/2014 | Yang et al. |
| 8,890,666 B2 | 11/2014 | Parker et al. |
| 8,890,668 B2 | 11/2014 | Pance et al. |
| 8,918,215 B2 | 12/2014 | Bosscher et al. |
| 8,928,621 B2 | 1/2015 | Ciesla et al. |
| 8,947,383 B2 | 2/2015 | Ciesla et al. |
| 8,948,821 B2 | 2/2015 | Newham et al. |
| 8,952,937 B2 | 2/2015 | Shih et al. |
| 8,970,534 B2 | 3/2015 | Adachi et al. |
| 8,976,141 B2 | 3/2015 | Myers et al. |
| 9,008,730 B2 | 4/2015 | Kim et al. |
| 9,012,795 B2 | 4/2015 | Niu |
| 9,013,426 B2 | 4/2015 | Cole et al. |
| 9,019,088 B2 | 4/2015 | Zawacki et al. |
| 9,024,738 B2 | 5/2015 | Van Schyndel et al. |
| 9,035,887 B1 | 5/2015 | Prud'Hommeaux et al. |
| 9,072,576 B2 | 7/2015 | Nishiura |
| 9,083,821 B2 | 7/2015 | Hughes |
| 9,092,129 B2 | 7/2015 | Abdo et al. |
| 9,098,984 B2 | 8/2015 | Heubel et al. |
| 9,098,991 B2 | 8/2015 | Park et al. |
| 9,117,347 B2 | 8/2015 | Matthews |
| 9,122,325 B2 | 9/2015 | Peshkin et al. |
| 9,131,039 B2 | 9/2015 | Behles |
| 9,134,834 B2 | 9/2015 | Reshef |
| 9,141,225 B2 | 9/2015 | Cok et al. |
| 9,158,379 B2 | 10/2015 | Cruz-Hernandez et al. |
| 9,178,509 B2 | 11/2015 | Bernstein |
| 9,189,932 B2 | 11/2015 | Kerdemelidis et al. |
| 9,201,458 B2 | 12/2015 | Hunt et al. |
| 9,202,355 B2 | 12/2015 | Hill |
| 9,219,401 B2 | 12/2015 | Kim et al. |
| 9,235,267 B2 | 1/2016 | Pope et al. |
| 9,274,601 B2 | 3/2016 | Faubert et al. |
| 9,274,602 B2 | 3/2016 | Garg et al. |
| 9,274,603 B2 | 3/2016 | Modarres et al. |
| 9,275,815 B2 | 3/2016 | Hoffmann |
| 9,285,923 B2 | 3/2016 | Liao et al. |
| 9,293,054 B2 | 3/2016 | Bruni et al. |
| 9,300,181 B2 | 3/2016 | Maeda et al. |
| 9,310,906 B2 | 4/2016 | Yumiki et al. |
| 9,310,950 B2 | 4/2016 | Takano et al. |
| 9,317,116 B2 | 4/2016 | Ullrich et al. |
| 9,317,118 B2 | 4/2016 | Puskarich |
| 9,317,154 B2 | 4/2016 | Perlin et al. |
| 9,318,942 B2 | 4/2016 | Sugita et al. |
| 9,325,230 B2 | 4/2016 | Yamada et al. |
| 9,330,544 B2 | 5/2016 | Levesque et al. |
| 9,357,052 B2 | 5/2016 | Ullrich |
| 9,360,944 B2 | 6/2016 | Pinault |
| 9,367,238 B2 | 6/2016 | Tanada |
| 9,380,145 B2 | 6/2016 | Tartz et al. |
| 9,390,599 B2 | 7/2016 | Weinberg |
| 9,396,434 B2 | 7/2016 | Rothkopf |
| 9,405,369 B2 | 8/2016 | Modarres et al. |
| 9,411,423 B2 | 8/2016 | Heubel |
| 9,417,695 B2 | 8/2016 | Griffin et al. |
| 9,430,042 B2 | 8/2016 | Levin |
| 9,448,628 B2 | 9/2016 | Tan et al. |
| 9,448,713 B2 | 9/2016 | Cruz-Hernandez et al. |
| 9,449,476 B2 | 9/2016 | Lynn |
| 9,452,268 B2 | 9/2016 | Badaye et al. |
| 9,454,239 B2 | 9/2016 | Elias et al. |
| 9,467,033 B2 | 10/2016 | Jun et al. |

(56) References Cited

U.S. PATENT DOCUMENTS

| | | |
|---|---|---|
| 9,468,846 B2 | 10/2016 | Terrell et al. |
| 9,471,172 B2 | 10/2016 | Sirois |
| 9,477,342 B2 | 10/2016 | Daverman et al. |
| 9,480,947 B2 | 11/2016 | Jiang et al. |
| 9,489,810 B2 | 11/2016 | Tissot |
| 9,501,912 B1 | 11/2016 | Havskjold et al. |
| 9,542,028 B2 | 1/2017 | Filiz et al. |
| 9,544,694 B2 | 1/2017 | Abe et al. |
| 9,564,029 B2 | 2/2017 | Morrell et al. |
| 9,576,445 B2 | 2/2017 | Cruz-Hernandez |
| 9,595,659 B2 | 3/2017 | Kim |
| 9,600,070 B2 | 3/2017 | Chatterjee et al. |
| 9,608,506 B2 | 3/2017 | Degner et al. |
| 9,622,214 B2 | 4/2017 | Ryu |
| 9,640,048 B2 | 5/2017 | Hill |
| 9,652,040 B2 | 5/2017 | Martinez et al. |
| 9,659,482 B2 | 5/2017 | Yang et al. |
| 9,665,198 B2 | 5/2017 | Kies et al. |
| 9,836,270 B2 | 5/2017 | Yliaho |
| 9,692,286 B2 | 6/2017 | Endo et al. |
| 9,594,450 B2 | 7/2017 | Lynn et al. |
| 9,696,803 B2 | 7/2017 | Curz-Hernandez et al. |
| 9,727,157 B2 | 8/2017 | Ham et al. |
| 9,733,704 B2 | 8/2017 | Cruz-Hernandez et al. |
| 9,746,945 B2 | 8/2017 | Sheynblat et al. |
| 9,778,743 B2 | 10/2017 | Grant et al. |
| 9,779,592 B1 | 10/2017 | Hoen |
| 9,785,251 B2 | 10/2017 | Martisauskas |
| 9,823,833 B2 | 11/2017 | Grant et al. |
| 9,830,782 B2 | 11/2017 | Morrell et al. |
| 9,831,871 B2 | 11/2017 | Lee et al. |
| 9,836,123 B2 | 12/2017 | Gipson et al. |
| 9,846,484 B2 | 12/2017 | Shah |
| 9,857,872 B2 | 1/2018 | Terlizzi et al. |
| 9,870,053 B2 | 1/2018 | Modarres et al. |
| 9,886,093 B2 | 2/2018 | Moussette et al. |
| 9,891,708 B2 | 2/2018 | Cruz-Hernandez et al. |
| 9,904,393 B2 | 2/2018 | Frey et al. |
| 9,911,553 B2 | 3/2018 | Bernstein |
| 9,928,950 B2 | 3/2018 | Lubinski et al. |
| 9,934,661 B2 | 4/2018 | Hill |
| 9,970,757 B2 | 5/2018 | Das et al. |
| 9,990,099 B2 | 6/2018 | Ham et al. |
| 9,997,306 B2 | 6/2018 | Bernstein |
| 10,013,058 B2 | 7/2018 | Puskarich et al. |
| 10,032,550 B1 | 7/2018 | Zhang |
| 10,038,361 B2 | 7/2018 | Hajati et al. |
| 10,039,080 B2 | 7/2018 | Miller et al. |
| 10,061,386 B2 | 8/2018 | Frescas et al. |
| 10,062,832 B2 | 8/2018 | Caraveo et al. |
| 10,067,585 B2 | 9/2018 | Kim |
| 10,069,392 B2 | 9/2018 | Degner et al. |
| 10,108,151 B2 | 10/2018 | Cardinali et al. |
| 10,108,265 B2 | 10/2018 | Harley et al. |
| 10,120,446 B2 | 11/2018 | Pance et al. |
| 10,126,817 B2 | 11/2018 | Morrell et al. |
| 10,127,778 B2 | 11/2018 | Hajati et al. |
| 10,133,352 B2 | 11/2018 | Lee et al. |
| 10,139,907 B2 | 11/2018 | Billington |
| 10,139,959 B2 | 11/2018 | Butler et al. |
| 10,152,116 B2 | 12/2018 | Wang et al. |
| 10,198,097 B2 | 2/2019 | Lynn et al. |
| 10,204,494 B2 | 2/2019 | Do et al. |
| 10,236,760 B2 | 3/2019 | Moussette et al. |
| 10,268,272 B2 | 4/2019 | Chen |
| 10,276,001 B2 | 4/2019 | Smith et al. |
| 10,289,199 B2 | 5/2019 | Hoellwarth et al. |
| 10,338,682 B2 | 7/2019 | Heubel et al. |
| 10,345,905 B2 | 7/2019 | McClure et al. |
| 10,353,382 B2 | 7/2019 | Bodenstein |
| 10,353,467 B2 | 7/2019 | Augenbergs et al. |
| 10,367,950 B2 | 7/2019 | Davis et al. |
| 10,372,250 B2 | 8/2019 | Zhang et al. |
| 10,416,811 B2 | 9/2019 | Abdollahian et al. |
| 10,423,214 B2 | 9/2019 | Mistry et al. |
| 10,429,929 B2 | 10/2019 | Sulem et al. |
| 10,436,607 B2 | 10/2019 | Chen et al. |
| 10,444,834 B2 | 10/2019 | Vescovi |
| 10,444,841 B2 | 10/2019 | Nakamura et al. |
| 10,456,622 B2 | 10/2019 | Szabados et al. |
| 10,459,521 B2 | 10/2019 | Puskarich |
| 10,475,300 B2 | 11/2019 | Hill |
| 10,481,691 B2 | 11/2019 | Utterman et al. |
| 10,481,692 B2 | 11/2019 | Ullrich et al. |
| 10,488,927 B2 | 11/2019 | Lim et al. |
| 10,490,035 B2 | 11/2019 | Morrell et al. |
| 10,503,255 B2 | 12/2019 | Ramstein et al. |
| 10,504,339 B2 | 12/2019 | Birnbaum et al. |
| 10,514,761 B2 | 12/2019 | Rihn |
| 10,540,043 B2 | 1/2020 | Tanemura et al. |
| 10,545,604 B2 | 1/2020 | Bijamov et al. |
| 10,564,721 B2 | 2/2020 | Curz-Hernandez et al. |
| 10,566,888 B2 | 2/2020 | Degner et al. |
| 10,585,480 B1 | 3/2020 | Bushnell |
| 10,608,162 B2 | 3/2020 | Noguchi |
| 10,609,677 B2 | 3/2020 | Miller et al. |
| 10,622,538 B2 | 4/2020 | Zhang et al. |
| 10,651,716 B2 | 5/2020 | Moussette et al. |
| 10,691,211 B2 | 6/2020 | Amin-Shahidi et al. |
| 10,762,752 B1 | 9/2020 | Persson |
| 10,788,932 B2 | 9/2020 | Iuchi et al. |
| 10,809,805 B2 | 10/2020 | Chen |
| 10,890,973 B2 | 1/2021 | Hajati |
| 10,890,978 B2 | 1/2021 | Bushnell et al. |
| 10,942,571 B2 | 3/2021 | Hendren et al. |
| 10,976,824 B1 | 4/2021 | Amin-Shahidi |
| 11,165,382 B2 | 11/2021 | Creary et al. |
| 2002/0194284 A1 | 12/2002 | Haynes |
| 2003/0210259 A1 | 11/2003 | Liu |
| 2004/0021663 A1 | 2/2004 | Suzuki et al. |
| 2004/0127198 A1 | 7/2004 | Roskind et al. |
| 2005/0057528 A1 | 3/2005 | Kleen |
| 2005/0107129 A1 | 5/2005 | Kaewell et al. |
| 2005/0110778 A1 | 5/2005 | Ben Ayed |
| 2005/0118922 A1 | 6/2005 | Endo |
| 2005/0217142 A1 | 10/2005 | Ellis |
| 2005/0237306 A1 | 10/2005 | Klein et al. |
| 2005/0248549 A1 | 11/2005 | Dietz et al. |
| 2005/0258715 A1 | 11/2005 | Schlabach |
| 2006/0014569 A1 | 1/2006 | DelGiorno |
| 2006/0154674 A1 | 7/2006 | Landschaft et al. |
| 2006/0209037 A1 | 9/2006 | Wang et al. |
| 2006/0239746 A1 | 10/2006 | Grant |
| 2006/0252463 A1 | 11/2006 | Liao |
| 2007/0032270 A1 | 2/2007 | Orr |
| 2007/0043725 A1 | 2/2007 | Hotelling et al. |
| 2007/0099574 A1 | 5/2007 | Wang |
| 2007/0152974 A1 | 7/2007 | Kim et al. |
| 2007/0168430 A1 | 7/2007 | Brun et al. |
| 2007/0178942 A1 | 8/2007 | Sadler et al. |
| 2007/0188450 A1 | 8/2007 | Hernandez et al. |
| 2008/0084384 A1 | 4/2008 | Gregorio et al. |
| 2008/0165148 A1 | 7/2008 | Williamson |
| 2008/0181501 A1 | 7/2008 | Faraboschi |
| 2008/0181706 A1 | 7/2008 | Jackson |
| 2008/0192014 A1 | 8/2008 | Kent et al. |
| 2008/0204428 A1 | 8/2008 | Pierce et al. |
| 2008/0255794 A1 | 10/2008 | Levine |
| 2009/0002328 A1 | 1/2009 | Ullrich et al. |
| 2009/0015560 A1 | 1/2009 | Robinson et al. |
| 2009/0115734 A1 | 5/2009 | Fredriksson et al. |
| 2009/0120105 A1 | 5/2009 | Ramsay et al. |
| 2009/0128503 A1 | 5/2009 | Grant et al. |
| 2009/0135142 A1 | 5/2009 | Fu et al. |
| 2009/0167702 A1 | 7/2009 | Nurmi |
| 2009/0218148 A1 | 9/2009 | Hugeback et al. |
| 2009/0225046 A1 | 9/2009 | Kim et al. |
| 2009/0236210 A1 | 9/2009 | Clark et al. |
| 2009/0248037 A1* | 10/2009 | Prisco .................. A61B 34/71 606/130 |
| 2009/0259090 A1* | 10/2009 | Parker ................ A61N 1/36036 600/25 |
| 2009/0267892 A1 | 10/2009 | Faubert |
| 2009/0291670 A1 | 11/2009 | Sennett et al. |

(56) References Cited

U.S. PATENT DOCUMENTS

| | | |
|---|---|---|
| 2010/0020036 A1 | 1/2010 | Hui et al. |
| 2010/0053087 A1 | 3/2010 | Dai et al. |
| 2010/0089735 A1 | 4/2010 | Takeda et al. |
| 2010/0110018 A1 | 5/2010 | Faubert et al. |
| 2010/0141408 A1 | 6/2010 | Doy et al. |
| 2010/0141606 A1 | 6/2010 | Bae et al. |
| 2010/0148944 A1 | 6/2010 | Kim et al. |
| 2010/0152620 A1 | 6/2010 | Ramsay et al. |
| 2010/0164894 A1 | 7/2010 | Kim et al. |
| 2010/0188422 A1 | 7/2010 | Shingai et al. |
| 2010/0265197 A1 | 10/2010 | Purdy |
| 2010/0328229 A1 | 12/2010 | Weber et al. |
| 2011/0007023 A1 | 1/2011 | Abrahamsson et al. |
| 2011/0053577 A1 | 3/2011 | Lee et al. |
| 2011/0102161 A1* | 5/2011 | Heubel ............... G10L 15/22 704/275 |
| 2011/0107958 A1 | 5/2011 | Pance et al. |
| 2011/0121765 A1 | 5/2011 | Anderson et al. |
| 2011/0128239 A1 | 6/2011 | Polyakov et al. |
| 2011/0148608 A1 | 6/2011 | Grant et al. |
| 2011/0156539 A1 | 6/2011 | Park et al. |
| 2011/0157052 A1 | 6/2011 | Lee et al. |
| 2011/0163985 A1 | 7/2011 | Bae et al. |
| 2011/0216013 A1 | 9/2011 | Siotis |
| 2011/0248948 A1 | 10/2011 | Griffin et al. |
| 2011/0260988 A1 | 10/2011 | Colgate et al. |
| 2011/0263200 A1 | 10/2011 | Thornton et al. |
| 2011/0291950 A1 | 12/2011 | Tong |
| 2011/0304559 A1 | 12/2011 | Pasquero |
| 2012/0038582 A1* | 2/2012 | Grant ............... G06F 3/041 345/173 |
| 2012/0092263 A1 | 4/2012 | Peterson et al. |
| 2012/0126959 A1 | 5/2012 | Zarrabi et al. |
| 2012/0133494 A1 | 5/2012 | Cruz-Hernandez et al. |
| 2012/0206248 A1 | 8/2012 | Biggs |
| 2012/0256848 A1 | 10/2012 | Madabusi Srinivasan |
| 2012/0274578 A1 | 11/2012 | Snow et al. |
| 2012/0280927 A1 | 11/2012 | Ludwig |
| 2012/0319987 A1 | 12/2012 | Woo |
| 2012/0327006 A1 | 12/2012 | Israr et al. |
| 2013/0027345 A1 | 1/2013 | Binzel |
| 2013/0033967 A1 | 2/2013 | Chuang et al. |
| 2013/0043987 A1 | 2/2013 | Kasama et al. |
| 2013/0058816 A1 | 3/2013 | Kim |
| 2013/0106699 A1 | 5/2013 | Babatunde |
| 2013/0191741 A1 | 7/2013 | Dickinson et al. |
| 2013/0207793 A1 | 8/2013 | Weaber et al. |
| 2013/0217491 A1 | 8/2013 | Hilbert et al. |
| 2013/0261811 A1 | 10/2013 | Yagi et al. |
| 2013/0271902 A1* | 10/2013 | Lai ............... H05K 5/0086 361/679.01 |
| 2013/0300590 A1 | 11/2013 | Dietz et al. |
| 2014/0082490 A1 | 3/2014 | Jung et al. |
| 2014/0085065 A1 | 3/2014 | Biggs et al. |
| 2014/0132528 A1 | 5/2014 | Catton |
| 2014/0168153 A1 | 6/2014 | Deichmann et al. |
| 2014/0197936 A1 | 7/2014 | Biggs et al. |
| 2014/0267076 A1 | 9/2014 | Birnbaum et al. |
| 2015/0005039 A1 | 1/2015 | Liu et al. |
| 2015/0040005 A1 | 2/2015 | Faaborg et al. |
| 2015/0098309 A1 | 4/2015 | Adams et al. |
| 2015/0169059 A1 | 6/2015 | Behles et al. |
| 2015/0194165 A1 | 7/2015 | Faaborg et al. |
| 2015/0205355 A1 | 7/2015 | Yairi |
| 2015/0205417 A1 | 7/2015 | Yairi et al. |
| 2015/0296480 A1 | 10/2015 | Kinsey et al. |
| 2016/0103544 A1 | 4/2016 | Filiz et al. |
| 2016/0241119 A1 | 8/2016 | Keeler |
| 2016/0255944 A1* | 9/2016 | Baranski ............... A44C 5/2071 |
| 2017/0153703 A1 | 6/2017 | Yun et al. |
| 2017/0311282 A1 | 10/2017 | Miller et al. |
| 2017/0357325 A1 | 12/2017 | Yang et al. |
| 2017/0364158 A1 | 12/2017 | Wen et al. |
| 2018/0060941 A1 | 3/2018 | Yang et al. |
| 2018/0081441 A1 | 3/2018 | Pedder et al. |
| 2018/0090253 A1 | 3/2018 | Songatikamas et al. |
| 2018/0302881 A1 | 10/2018 | Miller et al. |
| 2018/0343986 A1* | 12/2018 | Lukens ............... G06F 1/163 |
| 2019/0204606 A1* | 7/2019 | Yang ............... H04R 5/0335 |
| 2019/0341677 A1* | 11/2019 | Hsu ............... A44C 5/0007 |
| 2019/0363577 A1* | 11/2019 | Slabaugh ............... H02J 50/005 |
| 2020/0026359 A1 | 1/2020 | Uttermann et al. |
| 2020/0027320 A1 | 1/2020 | Hill |
| 2021/0048894 A1* | 2/2021 | Wang ............... G06F 3/016 |
| 2021/0090733 A1 | 3/2021 | Dibari et al. |
| 2021/0283657 A1* | 9/2021 | Chauvette ............... B06B 1/14 |
| 2021/0312771 A1 | 10/2021 | Hill |
| 2021/0377587 A1* | 12/2021 | Ekanayake ............... H04N 7/142 |
| 2022/0336132 A1 | 10/2022 | Amin-Shahidi et al. |
| 2023/0094873 A1 | 3/2023 | Chen et al. |

FOREIGN PATENT DOCUMENTS

| | | |
|---|---|---|
| CA | 2355434 | 2/2002 |
| CN | 1324030 | 11/2001 |
| CN | 1692371 | 11/2005 |
| CN | 1817321 | 8/2006 |
| CN | 101120290 | 2/2008 |
| CN | 101409164 | 4/2009 |
| CN | 101763192 | 6/2010 |
| CN | 101903848 | 12/2010 |
| CN | 101938207 | 1/2011 |
| CN | 102025257 | 4/2011 |
| CN | 102057656 | 5/2011 |
| CN | 201829004 | 5/2011 |
| CN | 102163076 | 8/2011 |
| CN | 102246122 | 11/2011 |
| CN | 102315747 | 1/2012 |
| CN | 102591512 | 7/2012 |
| CN | 102667681 | 9/2012 |
| CN | 102713805 | 10/2012 |
| CN | 102754054 | 10/2012 |
| CN | 102768593 | 11/2012 |
| CN | 102844972 | 12/2012 |
| CN | 102915111 | 2/2013 |
| CN | 103019569 | 4/2013 |
| CN | 103154867 | 6/2013 |
| CN | 103155410 | 6/2013 |
| CN | 103181090 | 6/2013 |
| CN | 103218104 | 7/2013 |
| CN | 103278173 | 9/2013 |
| CN | 103416043 | 11/2013 |
| CN | 103440076 | 12/2013 |
| CN | 103567135 | 2/2014 |
| CN | 103970339 | 8/2014 |
| CN | 104049746 | 9/2014 |
| CN | 104220963 | 12/2014 |
| CN | 104917885 | 9/2015 |
| CN | 104956244 | 9/2015 |
| CN | 105556268 | 5/2016 |
| CN | 208013890 | 10/2018 |
| DE | 19517630 | 11/1996 |
| DE | 10330024 | 1/2005 |
| DE | 102008027720 | 12/2009 |
| DE | 102009038103 | 2/2011 |
| DE | 102011115762 | 4/2013 |
| EP | 0483955 | 5/1992 |
| EP | 1047258 | 10/2000 |
| EP | 1686776 | 8/2006 |
| EP | 2060967 | 5/2009 |
| EP | 2073099 | 6/2009 |
| EP | 2194444 | 6/2010 |
| EP | 2207080 | 7/2010 |
| EP | 2264562 A2 | 12/2010 |
| EP | 2315186 | 4/2011 |
| EP | 2374430 | 10/2011 |
| EP | 2395414 | 12/2011 |
| EP | 2461228 | 6/2012 |
| EP | 2631746 | 8/2013 |
| EP | 2434555 | 10/2013 |
| EP | 2148339 | 7/2015 |
| JP | H05301342 A2 | 11/1993 |
| JP | 2001095290 | 4/2001 |
| JP | 2002199689 | 7/2002 |

(56) References Cited

FOREIGN PATENT DOCUMENTS

| | | |
|---|---|---|
| JP | 2002102799 | 9/2002 |
| JP | 200362525 | 3/2003 |
| JP | 2003527046 | 9/2003 |
| JP | 200494389 | 3/2004 |
| JP | 2004236202 | 8/2004 |
| JP | 2006150865 | 6/2006 |
| JP | 3831410 | 10/2006 |
| JP | 2007519099 | 7/2007 |
| JP | 200818928 | 1/2008 |
| JP | 2010536040 | 11/2010 |
| JP | 2010272903 | 12/2010 |
| JP | 2011523840 | 8/2011 |
| JP | 2012135755 | 7/2012 |
| JP | 2013149124 | 8/2013 |
| JP | 2014002729 | 1/2014 |
| JP | 2014509028 | 4/2014 |
| JP | 2014235133 | 12/2014 |
| JP | 2014239323 | 12/2014 |
| JP | 2015153406 | 8/2015 |
| JP | 2015228214 | 12/2015 |
| JP | 2016095552 | 5/2019 |
| KR | 20050033909 | 4/2005 |
| KR | 1020100046602 | 5/2010 |
| KR | 1020110101516 | 9/2011 |
| KR | 20130024420 | 3/2013 |
| TW | 200518000 | 11/2007 |
| TW | 200951944 | 12/2009 |
| TW | 201145336 | 12/2011 |
| TW | 201218039 | 5/2012 |
| TW | 201425180 | 7/2014 |
| WO | WO 97/016932 | 5/1997 |
| WO | WO 00/051190 | 8/2000 |
| WO | WO 01/059558 | 8/2001 |
| WO | WO 01/089003 | 11/2001 |
| WO | WO 02/073587 | 9/2002 |
| WO | WO 03/038800 | 5/2003 |
| WO | WO 03/100550 | 12/2003 |
| WO | WO 06/057770 | 6/2006 |
| WO | WO 07/114631 | 10/2007 |
| WO | WO 08/075082 | 6/2008 |
| WO | WO 09/038862 | 3/2009 |
| WO | WO 09/068986 | 6/2009 |
| WO | WO 09/097866 | 8/2009 |
| WO | WO 09/122331 | 10/2009 |
| WO | WO 09/150287 | 12/2009 |
| WO | WO 10/085575 | 7/2010 |
| WO | WO 10/087925 | 8/2010 |
| WO | WO 11/007263 | 1/2011 |
| WO | WO 12/052635 | 4/2012 |
| WO | WO 12/129247 | 9/2012 |
| WO | WO 13/069148 | 5/2013 |
| WO | WO 13/150667 | 10/2013 |
| WO | WO 13/169299 | 11/2013 |
| WO | WO 13/169302 | 11/2013 |
| WO | WO 13/173838 | 11/2013 |
| WO | WO 13/186846 | 12/2013 |
| WO | WO 13/186847 | 12/2013 |
| WO | WO 14/018086 | 1/2014 |
| WO | WO 14/098077 | 6/2014 |
| WO | WO 15/023670 | 2/2015 |
| WO | WO 16/141482 | 9/2016 |
| WO | WO 17/027792 | 2/2017 |

OTHER PUBLICATIONS

Actuator definition downloaded from http://www.thefreedictionary.com/actuator on May 3, 2018, 2 pages.

Astronomer's Toolbox, "The Electromagnetic Spectrum," http://imagine.gsfc.nasa.gov/science/toolbox/emspectrum1.html, updated Mar. 2013, 4 pages.

Hasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.

Hill et al., "Real-time Estimation of Human Impedance for Haptic Interfaces," Stanford Telerobotics Laboratory, Department of Mechanical Engineering, Stanford University, Third Joint Eurohaptics Conference and Symposium on Haptic Interfaces for Virtual Environment and Teleoperator Systems, Salt Lake City, Utah, Mar. 18-20, 2009, pp. 440-445.

Kim et al., "Tactile Rendering of 3D Features on Touch Surfaces," UIST '13, Oct. 8-11, 2013, St. Andrews, United Kingdom, 8 pages.

Lee et al, "Haptic Pen: Tactile Feedback Stylus for Touch Screens," Mitsubishi Electric Research Laboratories, http://wwwlmerl.com, 6 pages, Oct. 2004.

Nakamura, "A Torso Haptic Display Based on Shape Memory Alloy Actuators," Massachusetts Institute of Technology, 2003, pp. 1-123.

Puntocellulare, "LG-GD910 3G Watch Phone," YouTube (http://www.youtube.com/watch?v+HcCI87KIELM), Jan. 8, 2009, 9 pages.

Sullivan, Mark, "This Android Wear Update Turns Your Device into The Dick Tracy Watch," Fast Company (https://www.fastcompany.com/3056319/this-android-wear-update-turns-your-device-into-the-dick-tracy-watch), Feb. 4, 2016, 9 pages.

\* cited by examiner

MODULAR SYSTEMS CONFIGURED TO PROVIDE LOCALIZED HAPTIC FEEDBACK USING INERTIAL ACTUATORS

FIELD

The described embodiments generally relate to providing haptic feedback. More particularly, the described embodiments relate to providing haptic feedback using inertial actuators.

BACKGROUND

Haptic feedback may be provided to a user of an electronic device in various ways. In some devices, haptic feedback may be provided by purely mechanical means, such as a buckling dome or spring-loaded mechanism that clicks, pops, or snaps as a button or key is depressed, or by a ball and detent mechanism that provides clicks as a crown or knob is rotated. In some devices, haptic feedback may be provided by electromechanical means, such as an inertial actuator that shakes an entire device, or by a piezoelectric actuator, shape memory alloy, or reluctance-based actuator that applies a force or vibration directly to a button, key, crown, or knob.

Factors that influence the selection of a haptic feedback device for a particular application include, for example, the size or cost of the electronic device, the available area or space on or within the device, the type of haptic feedback desired, whether haptic feedback can be provided globally or needs to be provided locally, the degree to which an input device (e.g., a button, key, crown, or knob) can move or needs to be water-proofed, and so on.

SUMMARY

Embodiments of the systems, devices, methods, and apparatus described in the present disclosure are directed to modular systems for providing localized haptic feedback and, more particularly, modular systems that include inertial actuators. Typically, inertial actuators (e.g., linear resonant actuators (LRMs), eccentric rotating masses (ERMs), and so on) are used to provide global haptic feedback. That is, an inertial actuator is typically used to shake an entire device. As described herein, an input device may be separated from a device's housing by a dampening mechanism, and an inertial actuator may be coupled to the input device to shake the input device and provide localized haptic feedback to the input device (i.e., with minimal or significantly damped shaking of the housing).

In a first aspect, the present disclosure describes an electronic device. The electronic device may include a housing defining an aperture. An input device may extend through the aperture and have a user input surface external to the housing. An inertial actuator may be mechanically and fixedly coupled to the input device and positioned within the housing. A mechanical wave dampener may provide mechanical wave dampening between the input device and the housing.

In another aspect, the present disclosure describes another electronic device. The electronic device may include a housing, a haptic feedback device, and an elastomer. The haptic feedback device may extend through the housing and include an input module having a user input surface, and an inertial actuation module that is rigidly attached to the input module. The elastomer may mechanically isolate the haptic feedback device from the housing.

In still another aspect of the disclosure, the present disclosure describes another electronic device. The electronic device may include a housing having an interior volume, a haptic feedback device, and a dampener. The haptic feedback device may include an input device extending through the housing, and an inertial actuator that is attached to the input device and configured to shake the input device. The dampener may be positioned between the haptic feedback device and the housing, and may be configured to dampen a propagation of mechanical waves traveling from the input device toward the housing.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
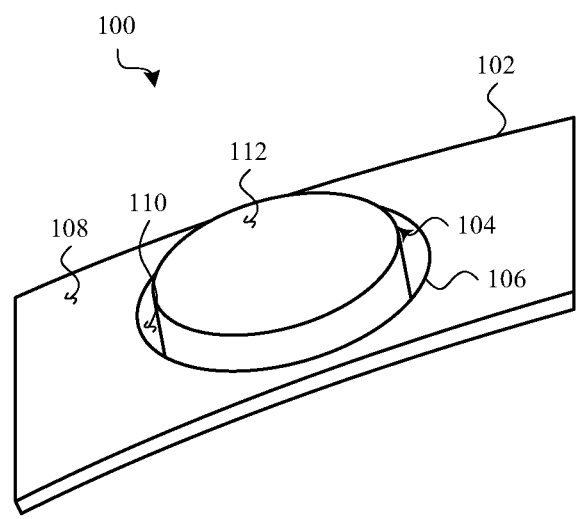
FIGS. 1A-1C show an example portion of an electronic device, including an input device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Haptic feedback is often provided by smaller mobile devices (e.g., phones, tablet or laptop computers, media players, and so on) and wearable devices (e.g., watches, headsets, earphones, fitness tracking devices, health monitoring devices, and so on) by shaking the entire device. The means for shaking the device is typically an inertial actuator, such as an LRA or an ERM. Inertial actuators are cost-effective and provide good haptic feedback. However, the haptic feedback is provided globally (i.e., the entire device is shaken), which may increase power consumption and, in some cases, provide a poor user experience.

Sometimes, it may be desirable to provide haptic feedback locally, such as to an input device (e.g., to a button, key, crown, or knob). In these cases, a force or vibration may be provided directly to the input device using a piezoelectric actuator, shape memory alloy, or reluctance-based actuator. However, to take advantage of the small form factor provided by these sorts of haptic feedback mechanisms, the input device and its haptic feedback mechanism need to be closely integrated—often requiring a custom-designed and design-intense solution.

In some devices, a user may be tricked into thinking haptic feedback is being provided locally when, in fact, it is being provided globally. For example, an inertial actuator may shake the entirety of a watch body when a user's finger is on a crown or button on the watch body, and the greater tactile sensitivity of a user's finger may cause the user to believe that haptic feedback is only being provided at the crown. In some cases, a higher frequency (or sharper) waveform may be used to mimic purely mechanical haptic feedback, which can sometimes improve the illusion of providing haptic feedback locally when, in fact, it is being provided globally.

Embodiments of the systems, devices, methods, and apparatus described in the present disclosure are directed to modular systems for providing localized haptic feedback and, more particularly, modular systems that provide localized haptic feedback using inertial actuators. The haptic feedback may be localized by coupling (e.g., attaching or anchoring) the inertial actuator directly to an input device, and using an elastomer, foam, springs, or other form of dampening material or mechanism to dampen the propagation of mechanical waves from the input device (or inertial actuator) to a device's housing.

These and other aspects are described with reference to FIGS. 1A-9. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "beneath", "left", "right", etc. may be used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. The use of alternative terminology, such as "or", is intended to indicate different combinations of the alternative elements. For example, A or B is intended to include A, or B, or A and B.

Figure 1B:
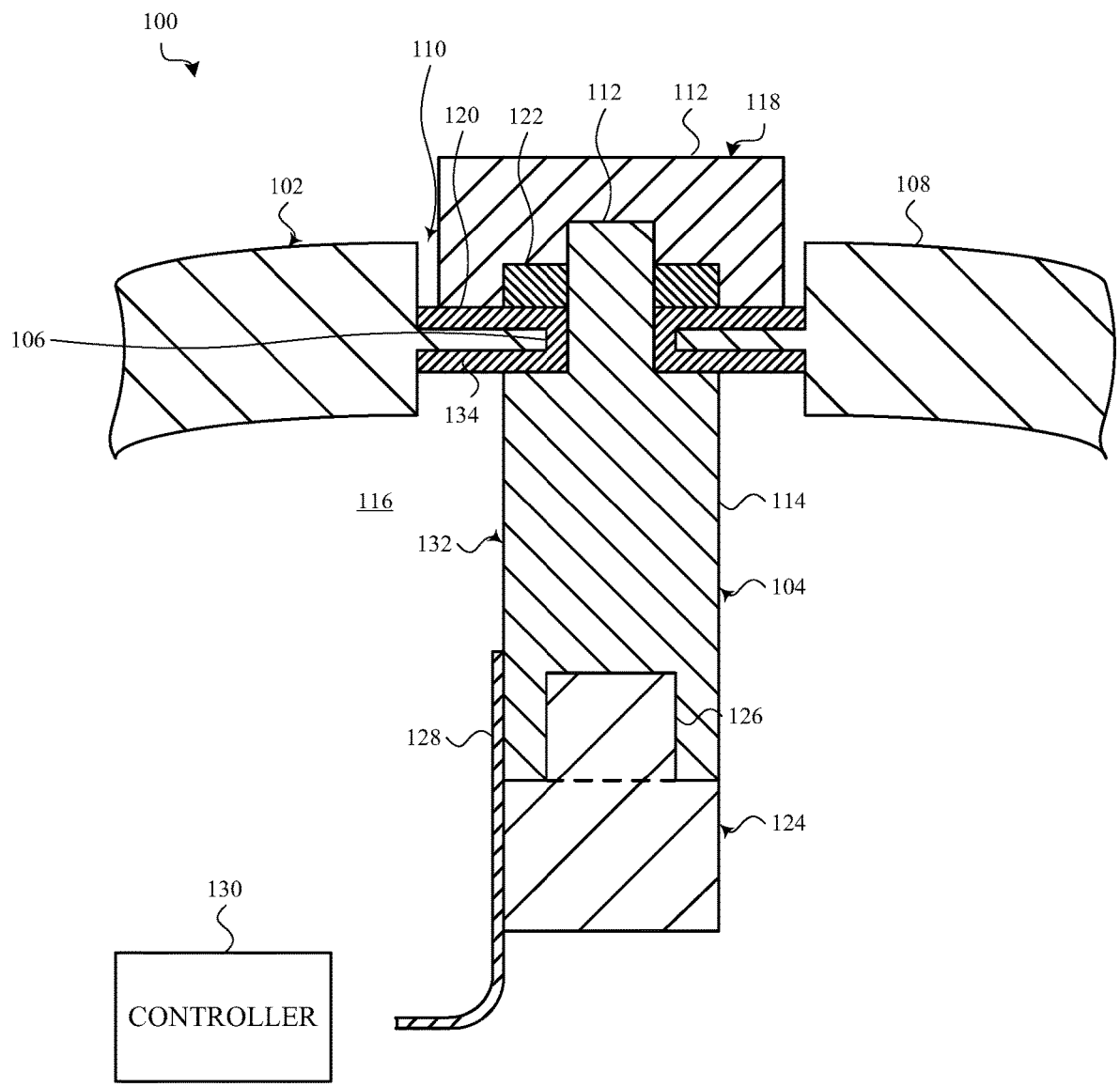
Figure 1C:
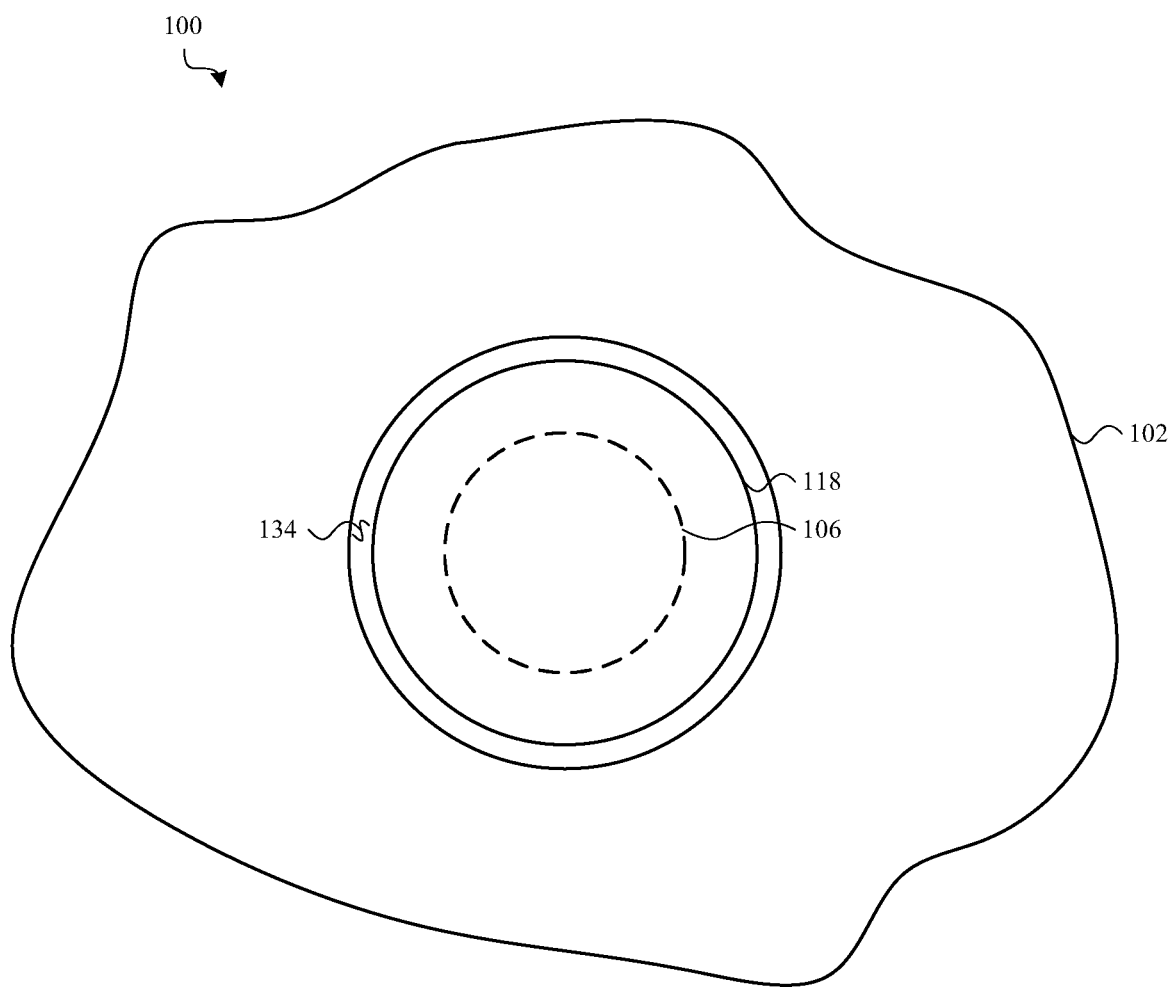

FIGS. 1A-1C show an example portion 100 of an electronic device. The portion 100 of the device includes a housing 102 and an input device 104. The input device 104 extends through an aperture 106 defined by the housing 102. FIG. 1A shows a perspective view of the housing 102 and input device 104, as might be seen by a user of the device. FIG. 1B shows a cross-section of the housing 102 and input device 104. FIG. 1C shows a plan view of the housing 102 and input device 104.

Referring primarily to FIG. 1A, the housing 102 is shown to have a convex exterior surface 108. A well 110 may be formed in the convex exterior surface 108, and the input device 104 may be disposed at least partially within the well 110 and at least partially outside the well 110 (e.g., outward from the convex exterior surface 108 of the housing 102). Alternatively, the input device 104 may be flush with the convex exterior surface 108, or may be set back from the top of the well 110. In other alternatives, the well 110 may not be provided, and the input device 104 may extend through the aperture 106 and extend outward from (or sit flush or inward from) the convex exterior surface 108. In still other alternatives, the convex exterior surface 108 may be flat, concave, or have other surface features. In some cases, the housing 102 may be formed from one or more of a polymer (plastic), glass, metal (e.g., aluminum, steel, or chrome), or other materials.

By way of example, the input device 104 may take the form of a crown. The crown may have a user input surface 112 external to the housing 102. In some cases, the crown may be immovable. As a user attempts to rotate, push, or pull the crown, electromechanical haptic feedback may be provided to a user to acknowledge the user's attempted rotations, pushes, or pulls. In some cases, the electromechanical haptic feedback may simulate mechanical haptic feedback to give the illusion that the crown is actually being rotated, pushed, or pulled. In other examples, the crown may actually be rotated, pushed, or pulled, and electromechanical haptic feedback may be used to acknowledge or accentuate the user's rotations, pushes, or pulls of the crown.

In alternative embodiments, the input device 104 may take the form of a button, knob, or other type of input device.

FIG. 1B shows an aperture 106 through which the input device 104 may extend. The aperture may be formed by a singular piece of the housing 102, as shown, or the aperture may be formed by two abutting pieces of the housing 102. For example, the aperture 106 may be formed between a sidewall and a front or rear cover of the housing 102.

The input device 104 may have a user input surface 112 external to the housing 102, and a body 114 (or shaft) that protrudes into an interior volume 116 of the housing 102. In some cases, the input device 104 may have a cap 118 that provides the user input surface 112, and the cap 118 may be attached to (e.g., screwed onto, snapped onto, or glued to) the body 114. In some cases, the fitment of the body 114 and the cap 118, in combination with a dampener 120, may secure the input device 104 to the housing 102. In other cases, the input device 104 may further include a fastener 122 (e.g., a nut or spring clip) that, in combination with the body 114 and the dampener 120, secures the input device 104 to the housing 102. In these latter cases, the cap 118 may be configured to provide a more pleasing user input surface 112, and the cap 118 need not necessarily be a structural member.

In some embodiments, the input device 104 may include, or be integrated with, electrical or electromechanical circuits (e.g., capacitive, resistive, ultrasonic, magnetic, pressuresensitive, or other types of circuits) that are used to detect or quantify user input provided on or near the user input surface 112.

An inertial actuator 124 may be mechanically and fixedly coupled to the input device 104 and positioned within the housing 102. In some cases, the inertial actuator 124 may be mechanically and fixedly coupled to the input device 104 using glue, weld, or a crimp. For example, the inertial actuator 124 may have a pair of spaced apart tabs 126 that are glued or welded to opposite sides of the body 114 of the input device 104. In some cases, the inertial actuator 124 may be mechanically and fixedly coupled to the input device 104 using a bracket, screws, or nuts and bolts. In some cases, the inertial actuator 124 may be mechanically and fixedly coupled to the input device 104 by a connector, which connector may or may not carry electrical signals to or from the input device 104. The "fixed" aspect of the inertial actuator 124 to input device 104 coupling may take the form of a rigid attachment (i.e., a coupling that transfers substantially all of the inertial actuator's movement (>90%) to the input device 104) or a semi-rigid coupling (i.e., a coupling that transfers a majority (>50%) or high percentage (>80%) of the inertial actuator's movement to the input device 104).

The inertial actuator 124 may take various forms, and in some cases may be or include an LRA or ERM. The inertial actuator 124 may be suspended from the input device 104 within the housing 102, and may lack any sort of rigid or semi-rigid coupling with the housing 102. In some cases, a foam, gel, or other type of padding or filler may be provided between the inertial actuator 124 and the housing 102. However, padding or fillers that tend to dampen versus propagate motion of the inertial actuator 124 are not deemed to couple the inertial actuator 124 to the housing 102.

A flexible interconnect 128 may be coupled to the inertial actuator 124 and configured to carry control signals provided to the inertial actuator 124. Conductors included in or on the flexible interconnect 128 may be electrically coupled to both the inertial actuator 124 and a controller 130 (e.g., a circuit, microcontroller, or processor). In some cases, the flexible interconnect 128 may be shared with the input device 104 (e.g., the flexible interconnect 128 may be a shared flexible interconnect). In these cases, the flexible interconnect 128 may also carry input signals generated by the input device 104 (and, in some cases, control signals provided to the input device 104) from/to the controller 130 (or to a different controller). The flexible nature of the flexible interconnect 128 may enable the inertial actuator 124 to move freely (or relatively freely) and may tend not to propagate mechanical waves generated by the inertial actuator 124.

When activated, the inertial actuator 124 may shake the input device 104. The shaking may produce periodic or somewhat random vibrations. In some cases, the controller 130 may operate the inertial actuator 124 in accord with a periodic or aperiodic activation signal (or waveform). In some cases, the controller 130 may apply different activation waveforms to the inertial actuator 124. For example, a first activation waveform, having a first profile, may be applied to the inertial actuator 124 when a user initiates a scroll operation on the input device 104, and a second activation waveform, having a second profile different from the first profile, may be applied to the inertial actuator 124 when the user initiates a push operation on the input device 104. Because the input device 104 is separated from the housing 102 by the dampener 120, the controller 130 is able to provide localized haptic feedback to the input device 104, with less or none of the haptic feedback being provided to the housing 102.

The input device 104, together with the inertial actuator 124, may provide a haptic feedback device 132 that extends through the housing 102. In some cases, the input device 104 may extend through the housing 102, as shown. In other cases, the inertial actuator 124 may additionally or alternatively extend through the housing 102.

The dampener 120 (e.g., a mechanical wave dampener) may be positioned between the haptic feedback device 132 and the housing 102. In some cases, the dampener 120 may be positioned between the input device 104 and the housing 102 and, in some cases, the dampener 120 may additionally or alternatively be positioned between the inertial actuator 124 and the housing 102. The dampener 120 may be configured to mechanically isolate the haptic feedback device 132 from the housing 102, such as by dampening a propagation of mechanical waves traveling from the input device 104 toward the housing 102. In some cases, the dampener 120 may be configured to dampen the mechanical waves by an order of magnitude or more before they reach the housing 102, and in some cases the dampener 120 may totally prevent mechanical waves generated by the haptic feedback device 132 from reaching the housing 102.

In some embodiments, the dampener 120 may take the form of a grommet (e.g., an elastomer grommet) that surrounds a cross-section of the haptic feedback device 132 (e.g., a cross-section of the input device 104) and fits around a lip 134 (FIG. 1C) of the housing 102. The lip 134 may have a circular or other-shaped perimeter. The grommet may extend over interior and exterior surfaces of the lip 134, with the lip 134 sandwiched between opposing surfaces of the grommet. Opposing interior surfaces of the grommet may extend over interior and exterior surfaces of the lip 134, with the lip 134 sandwiched therebetween. Opposing surfaces of the input device 104 (e.g., opposing surfaces of the body 114 and the fastener 122) may be seated against opposing exterior surfaces of the grommet and compress the grommet and lip 134 therebetween.

In alternative embodiments, the dampener 120 may include a pair of elastomers that respectively seat against the opposing interior and exterior surfaces of the lip 134, or one or more springs (e.g., one or more coil springs or spring washers), or other components. Instead of an elastomer component, or in addition to an elastomer component, the dampener 120 may include one or more foam, gel-filled, or paper (e.g., cardboard) components; or in the case of spring-type dampeners, the dampener 120 may include one or more metal components.

The dampener 120, or components thereof, may be tuned to dampen a particular type or range of mechanical waves, generated by a particular type or range of haptic feedback provided by the inertial actuator 124. Properties of the dampener 120 that may be tuned include its composition, thickness, hardness, width, cross-section, fill, spring constant, and so on. In some cases, the dampener 120 may be fluid-filled (e.g., air-filled or gel-filled). In some cases, the dampener 120 may have nubs, dimples, rings, or other features that provide a stand-off (e.g., air-filled gaps) between the housing 102 and portions of the dampener 120. In some cases, the dampener 120 may allow for more movement, or for particular kinds of movement, in some directions but not others. If the inertial actuator 124 is configured to move the input device 104 in and out with respect to the housing 102, the dampener 120 may be relatively thicker than if the inertial actuator 124 is configured to move the input device 104 side-to-side or tilt the input device 104. When the dampener 120 includes an elastomer, the elastomer may in some cases be silicone rubber.

The modular nature of the haptic feedback device 132 can enable it to be implemented in a variety of devices and used for a variety applications. In some cases, a designer of the haptic feedback device 132 may select an input module (i.e., a module including an input device, such as a crown, button, keycap, or knob) from a set of off-the-shelf input modules, and select an inertial actuation module (i.e., a module including an inertial actuator), and then mechanically and fixedly attach the modules together to form the haptic feedback device 132. The modular haptic feedback device 132 may then be inserted into the aperture 106 of the housing 102, and may be separated from the housing 102 by the dampener 120. In addition to a modular solution enabling a combination of off-the-shelf components, a modular solution makes it possible to test the operation of the components individually (e.g., as compared to a custom-designed integrated solution).

FIGS. 2-5B illustrate specific examples of an input device, an inertial actuator, a dampener, and an assembled haptic feedback device that extends through a housing.

Figure 2:
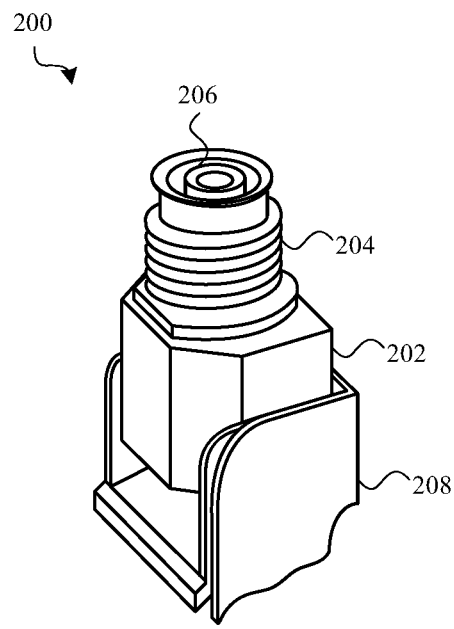
FIG. 2 shows an example body of an input device.

FIG. 2 shows an example body 200 of an input device. The body 200 includes a base 202 and a neck 204. The base 202 may include various types of sensing or control circuitry. The neck 204 may extend from the base 202, and in some cases may be configured to mate with a fastener. For example, the neck 204 may be threaded, and may receive a nut that helps retain the neck 204 within an aperture of a housing. A fixed or rotatable shaft 206 may in some cases extend through the neck 204. A cap, such as the cap described with reference to FIG. 1B, may be attached to the shaft 206.

A flexible interconnect 208 may be electrically connected to the circuitry housed within the base 202.

Figure 3:
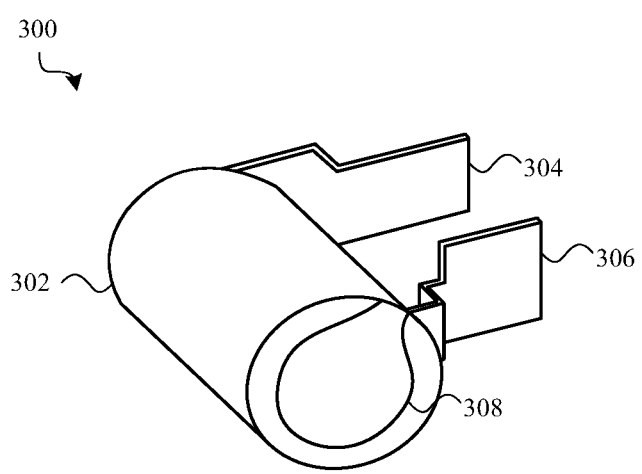
FIG. 3 shows an example of an inertial actuator.

FIG. 3 shows an example inertial actuator 300. In some cases, the inertial actuator 300 may be an LRA or ERM. Moving components of the inertial actuator 300 may be housed within a cylindrical or other-shaped body 302. A pair of tabs 304, 306 may extend from the body 302 and provide a means for mechanically and fixedly coupling the inertial actuator 300 to an input device (e.g., by gluing, welding, or crimping). In some cases, the tabs 304, 306, or another form of bracket, may include holes through which screws or bolts may be inserted to attach the inertial actuator 300 to an input device.

A flexible interconnect 308, and in some cases the same flexible interconnect that connects to an input device, may be electrically connected to the circuitry housed within the body 302.

Figure 4:
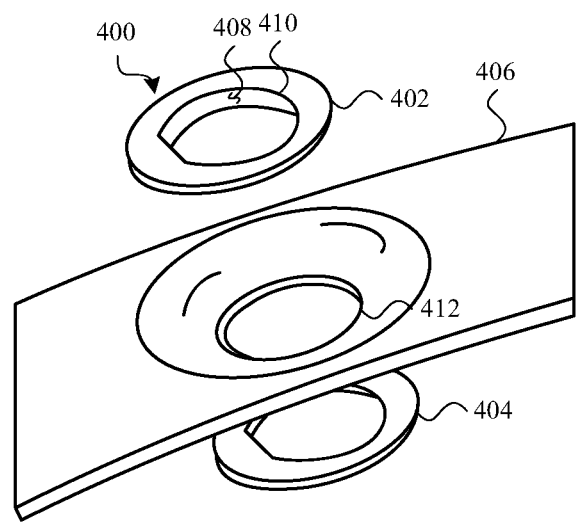
FIG. 4 shows an example two-piece dampener.

FIG. 4 shows an example two-piece dampener 400, including a first washer or component 402 and a second washer or component 404. The first component 402 may be seated against an exterior of a housing 406, and the second component 404 may be seated against an interior of the housing 406. The first and second components 402, 404 may be compressed between surfaces of an input device, and may function as a mechanical wave dampener. One or both of the components may have a neck or protrusion 408 around its aperture 410, which neck or protrusion 408 may extend through an aperture 412 in the housing 406 and isolate an input device or haptic feedback device from the walls of the aperture 412.

In alternative embodiments, the first and second components 402, 404 may be replaced by a grommet, as shown in FIG. 1B.

Figure 5A:
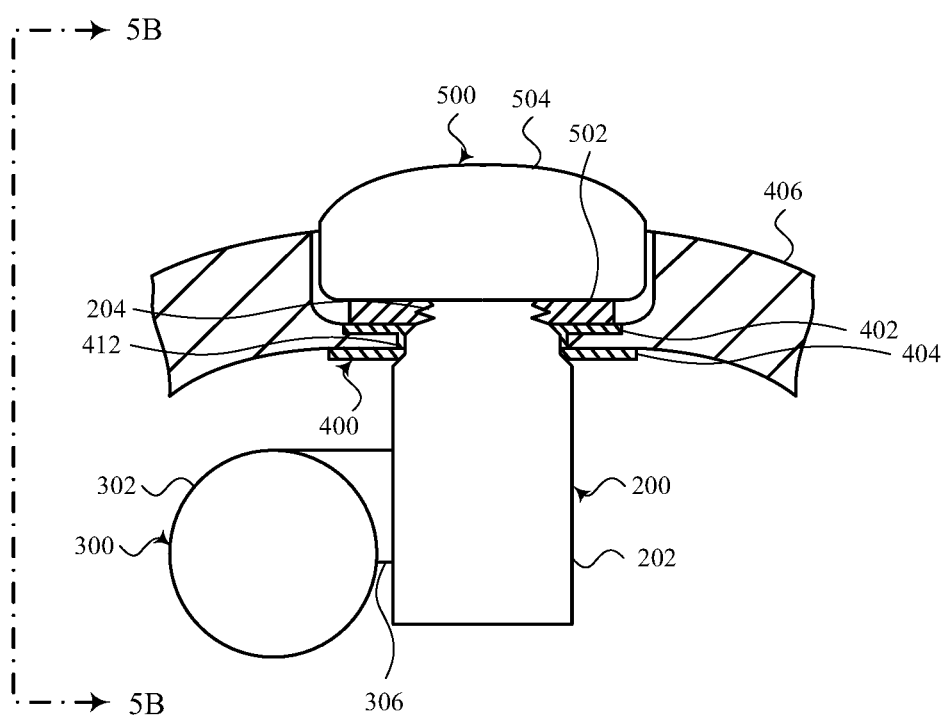
FIGS. 5A and 5B show an assembled form of the housing, input device, inertial actuator, and dampener described with reference to FIGS. 2-4.
Figure 5B:
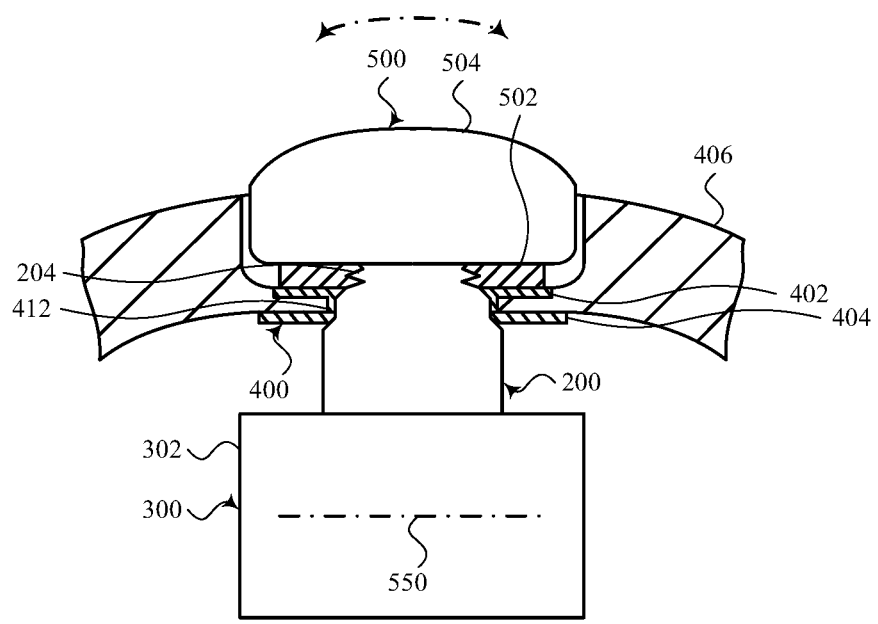

FIGS. 5A and 5B show an assembled form of the housing 406, input device, inertial actuator 300, and dampener 400 described with reference to FIGS. 2-4. As shown in FIG. 5A, the tabs (e.g., tab 306) of the inertial actuator 300 may be positioned against opposite surfaces of the base 202 of the input device 500. The tabs 304, 306 may be glued or welded to the base 202.

Although the body 302 of the inertial actuator 300 is shown to be positioned to one side of the base 202 (i.e., laterally offset from the base 202), the body 302 of the inertial actuator 300 may alternatively be positioned at an end of the base 202 or body 200 of the input device 500 (e.g., in an in-line configuration). The position of the body 302 of the inertial actuator 300 with respect to the base 202 or body 200 of the input device 500 may be adjusted, as desired, for a particular application.

The dampener components 402, 404 may be positioned against respective interior and exterior surfaces of the housing 406, around the aperture 412 in the housing 406. Then, the neck 204 of the input device 500 may be inserted into the aperture 412. The neck 204 may be retained within the aperture 412 by threading a nut 502 onto the neck 204. The nut 502 may be tightened to compress the dampener components 402, 404 and form a seal that prevents fluid or other environmental contaminants from entering the interior of a device through the aperture 412.

A cap 504 may be snapped, glued, or threaded onto the neck 204 of the input device 500 and/or may be coupled to a shaft that extends through the neck 204 of the input device 500.

As shown in FIG. 5B (showing view 5B-5B with respect to FIG. 5A), the inertial actuator 300 may be configured to move along an axis 550 of its cylindrical body 302, thereby providing haptic feedback to the cap 504 by causing the cap 504 to tilt one direction and then the opposite direction (e.g., to the left and to the right in FIG. 5B). Linear movement within the inertial actuator 300 may be converted to non-linear movement of the cap 504. Alternatively, the inertial actuator 300 could be configured to generate movements that are more or less parallel to an axis of the neck 204 and cap 504, such that the cap 504 moves inward and outward from a device to provide haptic feedback to a user of the device.

Figure 6:
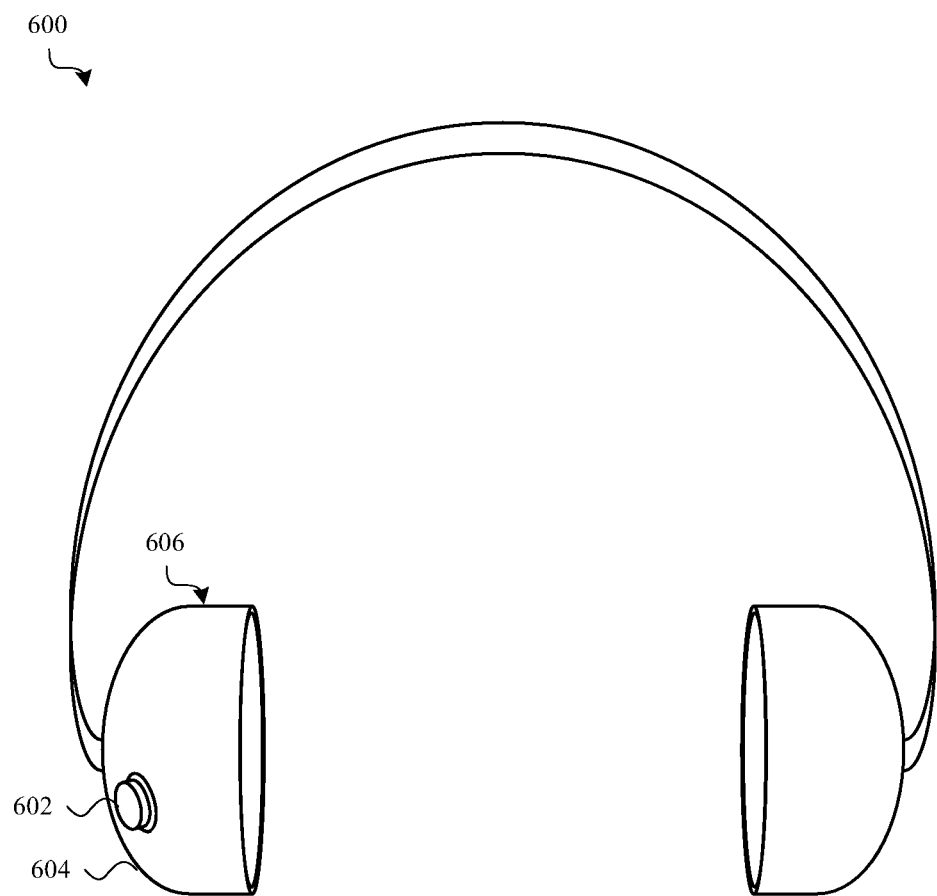
FIG. 6 shows an example of a headset that includes a crown.
Figure 7:
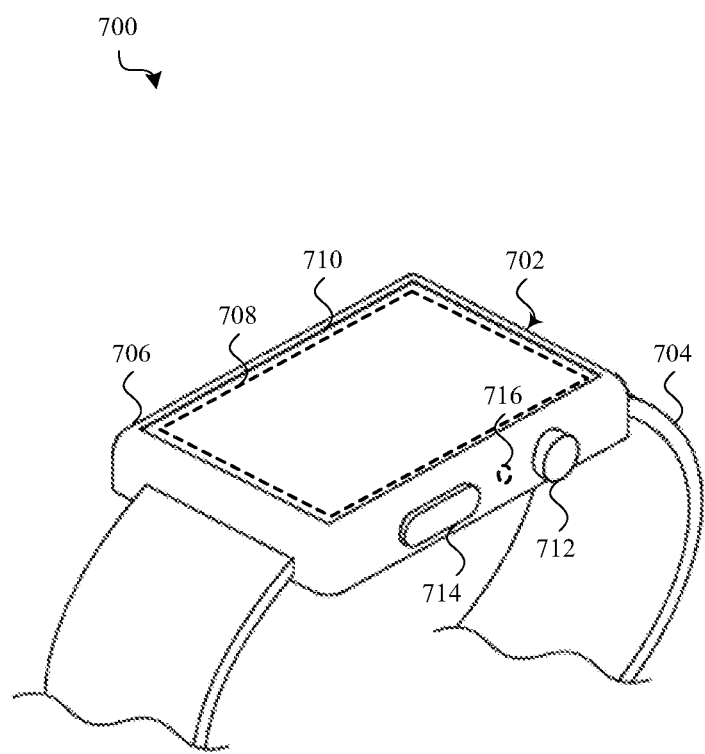
FIG. 7 shows an example of an electronic watch that includes a crown and a button.
Figure 8:
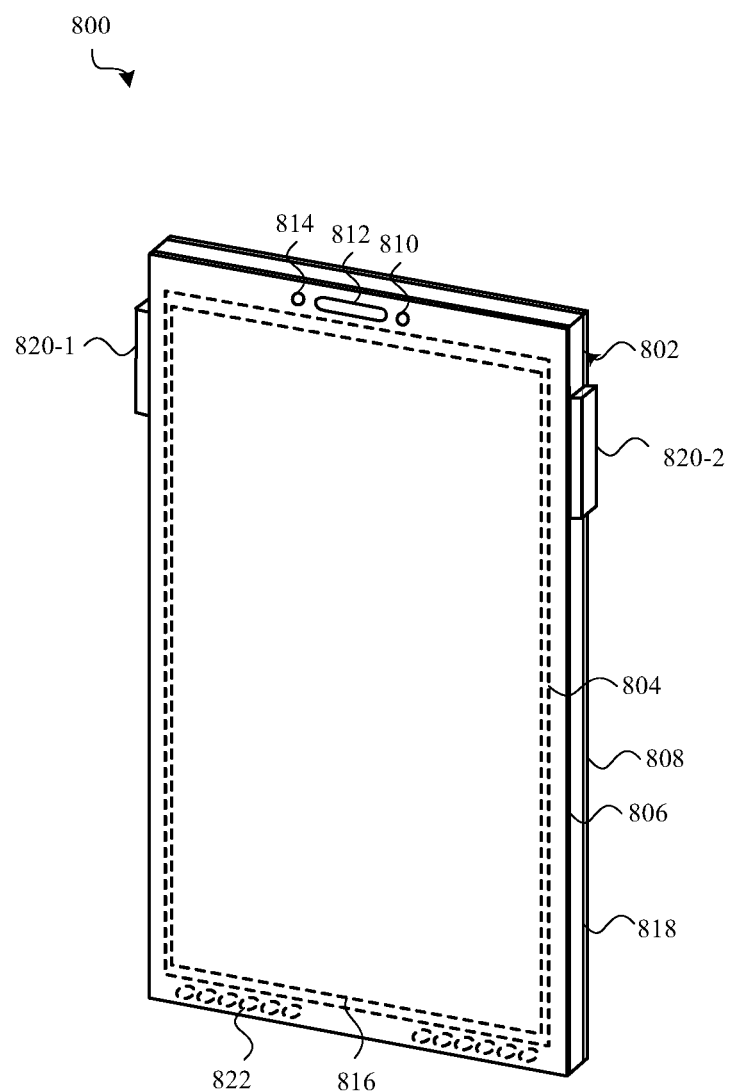
FIG. 8 shows an example of a mobile phone that includes a pair of buttons.

FIGS. 6-8 show various examples of devices that may incorporate a crown or button configured as described with reference to any of FIGS. 1A-5B. In particular, FIG. 6 shows an example of a headset 600 that includes a crown 602. The crown 602 may be used to turn the headset 600 on; to adjust the volume of the headset 600; or for other purposes. If an inertial actuator were to be anchored to the housing 604 of an ear cup 606 of the headset 600, and haptic feedback were to be provided globally to the ear cup 606, the haptic feedback may provide an unfavorable user experience to a user of the headset 600. For example, shaking of the ear cup 606 might be felt on the user's ear instead of on the user's finger (e.g., as they operate the crown 602 with their finger). Perhaps worse, the shaking of the ear cup 606 might generate sound waves which interfered with the user's enjoyment of the audio produced by the headset 600. Configuring the crown 602 similarly to the haptic feedback devices described with reference to FIGS. 1A-5B enables haptic feedback to be provided to the crown 602, while dampening the propagation of mechanical waves provided to the crown 602 so that they do not travel to the ear cup 606 (or are dampened as they travel from the crown 602 toward the ear cup 606).

FIG. 7 shows an example of an electronic watch 700 or other wearable device (e.g., a health monitoring device or a fitness tracking device). The watch 700 may include a body 702 (e.g., a watch body) and a band 704. The band 704 may be used to attach the watch body 702 to a body part (e.g., an arm, wrist, leg, ankle, or waist) of a user. A housing of the watch body 702 may include a sidewall 706 that at least partially surrounds a display 708. The sidewall 706 may support other housing components, such as a front cover 710 or a rear cover. The front cover 710 may be positioned over the display 708, and may provide a window through which the display 708 may be viewed. In some embodiments, the display 708 may be attached to (or abut) the sidewall 706 and/or the front cover 710. In alternative embodiments of the watch 700, the display 708 may not be included and/or the sidewall 706 may have an alternative configuration.

The various components of the device's housing (e.g., the sidewall 706, the front cover 710, and the rear cover) may be formed from the same or different materials. In some cases, the sidewall 706 may be formed using one or more metals (e.g., stainless steel), polymers (e.g., plastics), ceramics, or composites (e.g., carbon fiber). The front cover 710 may be formed, for example, using one or more of glass, a crystal (e.g., sapphire), or a transparent polymer (e.g., plastic) that enables a user to view the display 708 through the front cover 710. In some cases, a portion of the front cover 710 (e.g., a perimeter portion of the front cover 710) may be coated with an opaque ink to obscure components included within the housing. The rear cover may be formed using the same material(s) that are used to form the sidewall 706 or the front cover 710. In some cases, the rear cover may be part of a monolithic element that also forms the sidewall 706. In still other embodiments, all of the exterior components of the housing may be formed from a transparent material, and components within the watch 700 may or may not be obscured by an opaque ink or opaque structure within the housing.

The front cover 710 may be mounted to the sidewall 706 to cover an opening defined by the sidewall 706 (i.e., an opening into an interior volume in which various electronic components of the watch 700, including the display 708, may be positioned). The front cover 710 may be mounted to the sidewall 706 using fasteners, adhesives, seals, gaskets, or other components.

A display stack or device stack (hereafter referred to as a "stack") including the display 708 may be attached (or abutted) to an interior surface of the front cover 710 and extend into the interior volume of the watch 700. In some cases, the stack may include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensor system) may be configured to detect a touch applied to an outer surface of the front cover 710 (e.g., to a display surface of the watch 700).

The display 708 may include one or more light-emitting elements and may be configured, for example, as a light-emitting diode (LED) display, an organic LED (OLED), a liquid crystal display (LCD), an electroluminescent (EL) display, or other type of display. In some embodiments, the display 708 may include, or be associated with, one or more touch, force, and/or pressure sensors that are configured to detect a touch, force, and/or pressure applied to a surface of the front cover 710.

The watch body 702 may include an input or selection device, such as a crown 712 or a button 714. The crown 712 or the button 714 may be used to control various aspects of the watch 700. For example, the crown 712 may be used to select an application displayed by the display 708, select a watch function, adjust a volume of a speaker, adjust a brightness of the display 708, provide a biometric, and so on. The button 714 may in some cases be used to turn the watch 700 on or off. In some cases, an inertial actuator may be attached to the crown 712 or the button 714, or different inertial actuators may be attached to each of the crown 712 and the button 714. In some cases, an inertial actuator may be attached to the crown 712 or the button 714 as described with reference to any of FIGS. 1A-5B.

The watch 700 may further include various sensor systems. For example, the watch 700 may include one or more cameras, speakers, microphones, or other components (e.g., audio, imaging, and/or sensing components) that are configured to transmit or receive signals to/from the watch 700. In some embodiments, the watch 700 may have a port 716 (or set of ports) on the sidewall 706 (or elsewhere), and an ambient pressure sensor, ambient temperature sensor, internal/external differential pressure sensor, gas sensor, particulate matter sensor, or air quality sensor may be positioned in or near the port(s) 716.

FIG. 8 shows an example of a mobile phone (e.g., a smartphone). The phone 800 may include a housing 802 that at least partially surrounds a display 804. The housing 802 may include or support a front cover 806 or a rear cover 808. The front cover 806 may be positioned over the display 804, and may provide a window through which the display 804 (including images displayed thereon) may be viewed by a user. In some embodiments, the display 804 may be attached to (or abut) the housing 802 and/or the front cover 806.

The display 804 may include one or more light-emitting elements or pixels, and in some cases may be an LED display, an OLED display, an LCD, an EL display, a laser projector, or another type of electronic display. In some embodiments, the display 804 may include, or be associated with, one or more touch and/or force sensors that are configured to detect a touch and/or a force applied to a surface of the front cover 806.

The various components of the housing 802 may be formed from the same or different materials. For example, a sidewall 818 of the housing 802 may be formed using one or more metals (e.g., stainless steel), polymers (e.g., plastics), ceramics, or composites (e.g., carbon fiber). In some cases, the sidewall 818 may be a multi-segment sidewall including a set of antennas. The antennas may form structural components of the sidewall 818. The antennas may be structurally coupled (to one another or to other components) and electrically isolated (from each other or from other components) by one or more non-conductive segments of the sidewall 818. The front cover 806 may be formed, for example, using one or more of glass, a crystal (e.g., sapphire), or a transparent polymer (e.g., plastic) that enables a user to view the display 804 through the front cover 806. In some cases, a portion of the front cover 806 (e.g., a perimeter portion of the front cover 806) may be coated with an opaque ink to obscure components included within the housing 802. The rear cover 808 may be formed using the same material(s) that are used to form the sidewall 818 or the front cover 806, or may be formed using a different material or materials. In some cases, the rear cover 808 may be part of a monolithic element that also forms the sidewall 818 (or in cases where the sidewall 818 is a multi-segment sidewall, those portions of the sidewall 818 that are non-conductive).

In still other embodiments, all of the exterior components of the housing 802 may be formed from a transparent material, and components within the phone 800 may or may not be obscured by an opaque ink or opaque structure within the housing 802.

The front cover 806 may be mounted to the sidewall 818 to cover an opening defined by the sidewall 818 (i.e., an opening into an interior volume in which various electronic components of the phone 800, including the display 804, may be positioned). The front cover 806 may be mounted to the sidewall 818 using fasteners, adhesives, seals, gaskets, or other components.

A display stack or device stack (hereafter referred to as a "stack") including the display 804 (and in some cases the front cover 806) may be attached (or abutted) to an interior surface of the front cover 806 and extend into the interior volume of the phone 800. In some cases, the stack may also include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensor system) may be configured to detect a touch applied to an outer surface of the front cover 806 (e.g., to a display surface of the phone 800).

The stack may also include one or an array of sensors 816, with the sensors positioned in front of or behind, or interspersed with, the light-emitting elements of the display 804. In some cases, an array of sensors 816 may extend across an area equal in size to the area of the display 804. Alternatively, the array of sensors 816 may extend across an area that is smaller than or greater than the area of the display 804, or may be positioned entirely adjacent the display 804. Although the array of sensors 816 is shown to have a rectangular boundary, the array could alternatively have a boundary with a different shape, including, for example, an irregular shape. The array of sensors 816 may be variously configured as an ambient light sensor, a light-emitting element (e.g., OLED) health sensor (e.g., age sensor), a touch sensor, a proximity sensor, a health sensor, a biometric sensor (e.g., a fingerprint sensor or facial recognition sensor), a camera, a depth sensor, and so on. The array of sensors 816 may also or alternatively function as a proximity sensor, for determining whether an object (e.g., a finger, face, or stylus) is proximate to the front cover 806. In some embodiments, the array of sensors 816 may provide the touch sensing capability (i.e., touch sensor) of the stack.

In some cases, a force sensor (or part of a force sensor system) may be positioned within the interior volume below and/or to the side of the display 804 (and in some cases within the stack). The force sensor (or force sensor system) may be triggered in response to the touch sensor detecting one or more touches on the front cover 806 (or indicating a location or locations of one or more touches on the front cover 806), and may determine an amount of force associated with each touch, or an amount of force associated with the collection of touches as a whole.

In some cases, the front of the phone 800 may include one or more front-facing cameras 810, speakers 812, microphones, or other components 814 (e.g., audio, imaging, and/or sensing components) that are configured to transmit or receive signals to/from the phone 800. In some cases, a front-facing camera 810, alone or in combination with other sensors, may be configured to operate as a bio-authentication or facial recognition sensor. Additionally or alternatively, the array of sensors 816 may be configured to operate as a front-facing camera 810, a bio-authentication sensor, or a facial recognition sensor.

The phone 800 may also include buttons or other input devices positioned along the sidewall 818 and/or on a rear surface of the phone 800. For example, first and second buttons 820-1, 820-2 may be positioned along the sidewall 818, and in some cases may extend through apertures in the sidewall 818. These buttons 820-1, 820-2 may be used to adjust the volume of a speaker, turn the phone 800 off or on, and so on. In some embodiments, one or both of the buttons 820-1, 820-2 may be part of a haptic feedback device, and may be configured as described with reference to any of FIGS. 1A-5B.

The sidewall 818 may include one or more ports 822 that allow air, but not liquids, to flow into and out of the phone 800. In some embodiments, one or more sensors may be positioned in or near the port(s) 822. For example, an ambient pressure sensor, ambient temperature sensor, internal/external differential pressure sensor, gas sensor, particulate matter concentration sensor, or air quality sensor may be positioned in or near a port 822.

Figure 9:
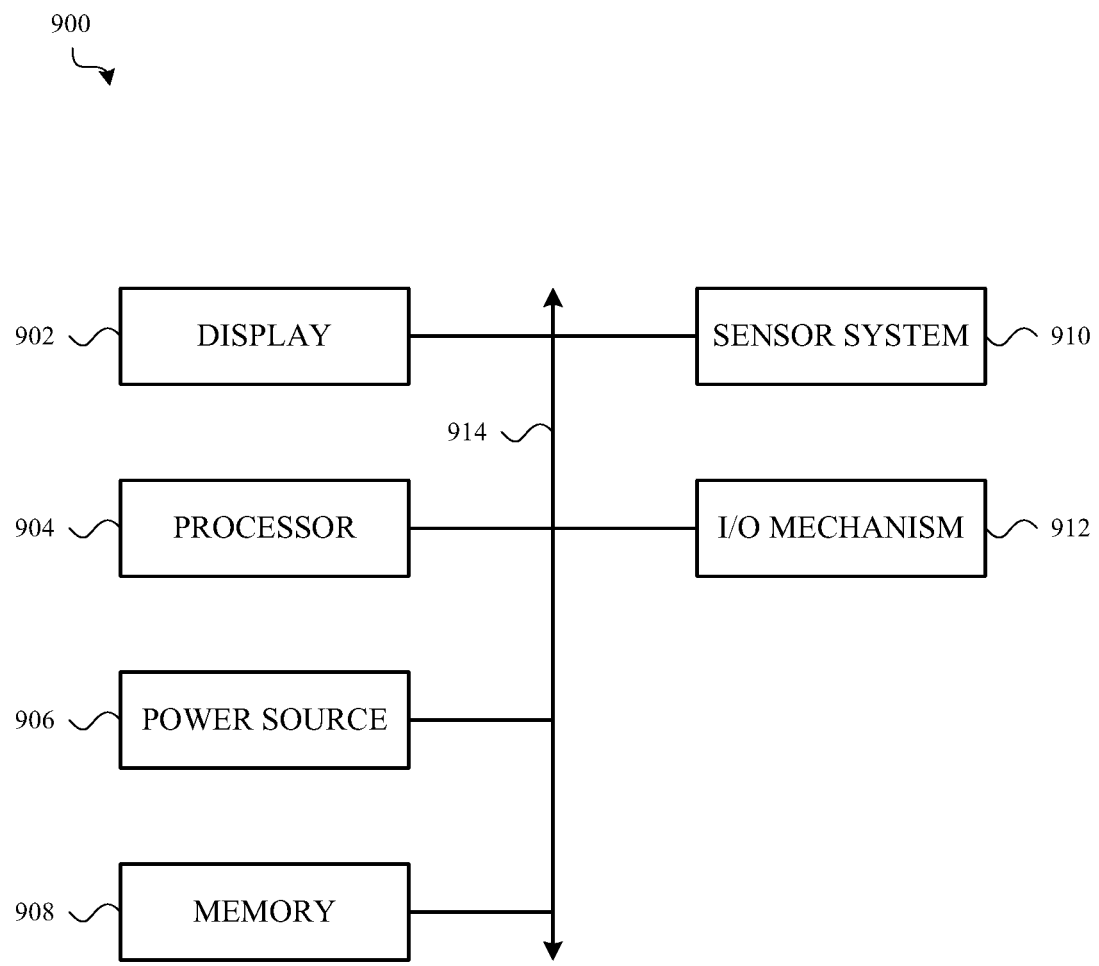
FIG. 9 shows a sample electrical block diagram of an electronic device.

FIG. 9 shows a sample electrical block diagram of an electronic device 900, which electronic device may in some cases take the form of one of the devices described with reference to FIGS. 6-8 and/or include one or more of the haptic feedback devices described with reference to FIGS. 1A-5B. The electronic device 900 may include a display 902 (e.g., a light-emitting display), a processor 904, a power source 906, a memory 908 or storage device, a sensor system 910, or an input/output (I/O) mechanism 912 (e.g., an input/output device, input/output port, or haptic input/output interface). The processor 904 may control some or all of the operations of the electronic device 900. The processor 904 may communicate, either directly or indirectly, with some or all of the other components of the electronic device 900. For example, a system bus or other communication mechanism 914 can provide communication between the display 902, the processor 904, the power source 906, the memory 908, the sensor system 910, and the I/O mechanism 912.

The processor 904 may be implemented as any electronic device capable of processing, receiving, or transmitting data or instructions, whether such data or instructions is in the form of software or firmware or otherwise encoded. For example, the processor 904 may include a microprocessor, a central processing unit (CPU), an application-specific integrated circuit (ASIC), a digital signal processor (DSP), a controller, or a combination of such devices. As described herein, the term "processor" is meant to encompass a single processor or processing unit, multiple processors, multiple processing units, or other suitably configured computing element or elements.

It should be noted that the components of the electronic device 900 can be controlled by multiple processors. For example, select components of the electronic device 900 (e.g., the sensor system 910) may be controlled by a first processor and other components of the electronic device 900 (e.g., the display 902) may be controlled by a second processor, where the first and second processors may or may not be in communication with each other.

The power source 906 can be implemented with any device capable of providing energy to the electronic device 900. For example, the power source 906 may include one or more batteries or rechargeable batteries. Additionally or alternatively, the power source 906 may include a power connector or power cord that connects the electronic device 900 to another power source, such as a wall outlet.

The memory 908 may store electronic data that can be used by the electronic device 900. For example, the memory 908 may store electrical data or content such as, for example, audio and video files, documents and applications, device settings and user preferences, timing signals, control signals, and data structures or databases. The memory 908 may include any type of memory. By way of example only, the memory 908 may include random access memory, read-only memory, Flash memory, removable memory, other types of storage elements, or combinations of such memory types.

The electronic device 900 may also include one or more sensor systems 910 positioned almost anywhere on the electronic device 900. The sensor system(s) 910 may be configured to sense one or more types of parameters, such as but not limited to, light; touch; force; heat; movement; relative motion; biometric data (e.g., biological parameters) of a user; particulate matter concentration, air quality; proximity; position; connectedness; and so on. By way of example, the sensor system(s) 910 may include a heat sensor, a position sensor, a light or optical sensor, an accelerometer, a pressure transducer, a gyroscope, a magnetometer, a health monitoring sensor, a particulate matter sensor, an air quality sensor, and so on. Additionally, the one or more sensor systems 910 may utilize any suitable sensing technology, including, but not limited to, magnetic, capacitive, ultrasonic, resistive, optical, acoustic, piezoelectric, or thermal technologies. In some cases, one or more of the sensor system(s) 910 may include one or more lasers and laser safety circuits as described herein.

The I/O mechanism 912 may transmit or receive data from a user or another electronic device. The I/O mechanism 912 may include the display 902, a touch sensing input surface, a crown, one or more buttons (e.g., a graphical user interface "home" button), one or more cameras (including an under-display camera), one or more microphones or speakers, one or more ports such as a microphone port, and/or a keyboard. Additionally or alternatively, the I/O mechanism 912 may transmit electronic signals via a communications interface, such as a wireless, wired, and/or optical communications interface. Examples of wireless and wired communications interfaces include, but are not limited to, cellular and Wi-Fi communications interfaces. In some cases, the I/O mechanism 912 may include one or more lasers and laser safety circuits as described herein.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. An electronic device, comprising:
    a housing defining an aperture;
    an input device extending through the aperture and having a user input surface external to the housing;
    an inertial actuator, mechanically and fixedly coupled to the input device and suspended within the housing; and
    a mechanical wave dampener positioned within the aperture and providing mechanical wave dampening between the input device and the housing.

2. The electronic device of claim 1, further comprising:
    a controller configured to operate the inertial actuator, providing localized haptic feedback to the input device; and
    a flexible interconnect, electrically coupling the inertial actuator to the controller.

3. The electronic device of claim 1, wherein the housing has a convex exterior surface.

4. The electronic device of claim 1, wherein the mechanical wave dampener comprises an elastomer.

5. The electronic device of claim 1, wherein the mechanical wave dampener comprises a foam.

6. The electronic device of claim 1, wherein the mechanical wave dampener comprises a spring.

7. The electronic device of claim 1, wherein the inertial actuator comprises a linear resonant actuator.

8. The electronic device of claim 1, wherein the inertial actuator comprises an eccentric rotating mass.

9. The electronic device of claim 1, wherein the input device is a crown.

10. The electronic device of claim 1, wherein the input device is a button.

11. The electronic device of claim 1, wherein the inertial actuator is mechanically and fixedly coupled to the input device by a bracket.

12. The electronic device of claim 1, wherein the inertial actuator is mechanically and fixedly coupled to the input device by glue.

13. An electronic device, comprising:
    a housing;
    a haptic feedback device extending through the housing and comprising:
        an input module extending through an aperture of the housing, the input module having a user input surface; and
        an inertial actuation module, rigidly attached to the input module; and
    an elastomer positioned within the aperture and mechanically isolating the haptic feedback device from the housing.

14. The electronic device of claim 13, wherein the housing defines an ear cup of a headset.

15. The electronic device of claim 13, wherein the housing defines a watch body.

16. An electronic device, comprising:
    a housing having an interior volume and an aperture;
    a haptic feedback device, comprising:
        an input device extending through the aperture; and
        an inertial actuator attached to the input device and configured to shake the input device; and
    a dampener positioned between the haptic feedback device and a portion of the housing and configured to dampen a propagation of mechanical waves traveling from the input device toward the housing.

17. The electronic device of claim 16, wherein the dampener comprises an elastomer.

18. The electronic device of claim 16, wherein the dampener comprises a grommet that surrounds a cross-section of the input device.

19. The electronic device of claim 16, further comprising:
    a shared flexible interconnect configured to carry input signals generated by the input device and control signals provided to the inertial actuator.

\* \* \* \* \*